United States Patent
Singarayan et al.

(10) Patent No.: US 10,511,546 B2
(45) Date of Patent: Dec. 17, 2019

(54) CONNECTING VIRTUAL NODES IN A NETWORK DEVICE USING ABSTRACT FABRIC INTERFACES

(71) Applicant: Juniper Networks, Inc., Sunnyvale, CA (US)

(72) Inventors: Babu Singarayan, San Jose, CA (US); Nitin Kumar, Fremont, CA (US); Raghavendra Mallya, Cupertino, CA (US); Jeyananth Minto Jeganathan, Pleasanton, CA (US); Kaliraj Vairavakkalai, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 51 days.

(21) Appl. No.: 15/844,338

(22) Filed: Dec. 15, 2017

(65) Prior Publication Data

US 2019/0104087 A1 Apr. 4, 2019

Related U.S. Application Data

(60) Provisional application No. 62/565,550, filed on Sep. 29, 2017.

(51) Int. Cl.
*H04L 12/933* (2013.01)
*H04L 12/947* (2013.01)
(Continued)

(52) U.S. Cl.
CPC .............. *H04L 49/15* (2013.01); *H04L 45/64* (2013.01); *H04L 45/66* (2013.01); *H04L 49/25* (2013.01); *H04L 45/02* (2013.01); *H04L 49/70* (2013.01)

(58) Field of Classification Search
None
See application file for complete search history.

(56) References Cited

U.S. PATENT DOCUMENTS

| 7,571,156 B1 | 8/2009 | Gupta et al. |
| 7,751,405 B1 | 7/2010 | Kompella |

(Continued)

FOREIGN PATENT DOCUMENTS

| EP | 1775908 A1 | 4/2007 |
| EP | 3076614 A1 | 10/2016 |

OTHER PUBLICATIONS

Rosen et al., "BGP/MPLS VPNs," RFC 2547, Network Working Group, Mar. 1999, 25 pp.

(Continued)

*Primary Examiner* — Kodzovi Acolatse
(74) *Attorney, Agent, or Firm* — Shumaker & Sieffert, P.A.

(57) ABSTRACT

In one example, a management component executing on a single-chassis network device configures a virtual node with an abstract fabric interface having, as a destination address, identifiers of packet processors (e.g., PTFE-IDs) assigned to the virtual node on the other end of the abstract fabric interface. The management component of the single-chassis network device pre-creates an underlay network by using the fabric links at the packet processor. When the management component creates and connects an abstract fabric interface on the virtual nodes, the management component forms an overlay network and attaches the overlay network to the underlay network, e.g., by programming the forwarding plane packet processor, to connect the virtual nodes. However, users of the network device, external devices, and routing protocols will not view the abstract fabric interface as an overlay interface, but as a regular Ethernet interface (e.g., a Gigabit Ethernet interface).

17 Claims, 19 Drawing Sheets

(51) Int. Cl.
  *H04L 12/715* (2013.01)
  *H04L 12/721* (2013.01)
  *H04L 12/751* (2013.01)
  *H04L 12/931* (2013.01)

(56) References Cited

U.S. PATENT DOCUMENTS

| | | | |
|---|---|---|---|
| 7,826,482 | B1 | 11/2010 | Minei et al. |
| 8,194,664 | B2 | 6/2012 | Dharwadkar |
| 8,634,422 | B2 | 1/2014 | Sali et al. |
| 8,953,439 | B1 | 2/2015 | Lin et al. |
| 8,953,599 | B1 | 2/2015 | Barth et al. |
| 9,100,289 | B2 * | 8/2015 | Mehta .................. H04L 43/0817 |
| 9,641,435 | B1 | 5/2017 | Sivaramakrishnan |
| 9,847,910 | B2 | 12/2017 | Chung |
| 2004/0013120 | A1 | 1/2004 | Shen |
| 2004/0073715 | A1 * | 4/2004 | Folkes .................... H04L 45/00 709/250 |
| 2005/0163115 | A1 | 7/2005 | Dontu et al. |
| 2007/0133406 | A1 | 6/2007 | Vasseur |
| 2007/0177622 | A1 | 8/2007 | Kim |
| 2008/0170578 | A1 | 7/2008 | Ould-brahim |
| 2008/0291862 | A1 | 11/2008 | Lu |
| 2009/0175274 | A1 | 7/2009 | Aggarwal et al. |
| 2009/0296568 | A1 | 12/2009 | Kitada et al. |
| 2010/0043068 | A1 | 2/2010 | Varadhan et al. |
| 2011/0225207 | A1 * | 9/2011 | Subramanian ........ H04L 45/586 707/803 |
| 2012/0069847 | A1 | 3/2012 | Saad et al. |
| 2013/0259058 | A1 | 10/2013 | Vairavakkalai |
| 2015/0071122 | A1 * | 3/2015 | Addanki ............. H04L 41/0886 370/255 |
| 2015/0117179 | A1 * | 4/2015 | Sato ........................ H04L 45/28 370/219 |
| 2015/0271102 | A1 | 9/2015 | Antich |
| 2015/0332155 | A1 | 11/2015 | Mermoud et al. |
| 2016/0080505 | A1 | 3/2016 | Sahin et al. |
| 2016/0087885 | A1 * | 3/2016 | Tripathi .............. G06F 9/45558 370/389 |
| 2016/0226754 | A1 | 8/2016 | Zhang |
| 2016/0294684 | A1 | 10/2016 | Vairavakkalai et al. |
| 2018/0176074 | A1 * | 6/2018 | Bangalore Krishnamurthy .......... H04L 47/125 |
| 2018/0225204 | A1 * | 8/2018 | Choudhari .......... G06F 9/45545 |
| 2018/0276024 | A1 * | 9/2018 | He ..................... G06F 9/45558 |
| 2018/0351862 | A1 | 12/2018 | Minto et al. |

OTHER PUBLICATIONS

Rosen et al., "BGP/MPLS IP Virtual Private Networks (VPNs)," RFC 4364, Network Working Group, Feb. 2006, 47 pp.

Aggarwal et al., "MPLS Upstream Label Assignment and Context-Specific Label Space," RFC 5331, Aug. 2008, 13 pp.

Rosen et al., "Multiprotocol Label Switching Architecture," RFC 3031, Network Working Group, Jan. 2001, 61 pp.

Rosen, "Using BGP to Bind MPLS Labels to Address Prefixes draft-ietf-mpls-rfc3107bis-00," Internet Engineering Task Force, IETF, Sep. 16, 2016, 22 pp.

Rekhter et al., "Carrying Label Information in BGP-4," RFC 3107, Network Working Group, May 2001, 8 pp.

Gredler et al., "Egress Peer Engineering using BGP-LU draft-gredler-idr-bgplu-epe-08," Inter-Domain Routing, Internet Draft, Juniper Networks, Inc., Mar. 13, 2017, 14 pp.

Rekhter et al., "A Border Gateway Protocol 4 (BGP-4)," RFC 4271, Network Working Group, Jan. 2006, 104 pp.

Osborne et al., "Traffic Engineering with MPLS," Cisco Press, Jul. 27, 2002, 675 pp.

Walton et al., "Advertisement of Multiple Paths in BGP," RFC 7911, Internet Engineering Task Force, IETF, Jul. 2016, 8 pp.

"Border Gateway Protocol," Wikipedia, the free encyclopedia, accessed from http://en.wikipedia.org/wiki/border_gateway_protocol, Mar. 27, 2015, 16 pp.

U.S. Appl. No. 15/610,254, by Juniper Networks, Inc., (Inventors: Vairavakkalai et al.), filed May 31, 2017.

U.S. Appl. No. 15/610,313, by Juniper Networks, Inc., (Inventors: Vairavakkalai et al.), filed May 31, 2017.

U.S. Appl. No. 15/610,427, by Juniper Networks, Inc., (Inventors: Jeganathan et al.), filed May 31, 2017.

U.S. Appl. No. 15/610,446, by Juniper Networks, Inc., (Inventors:Jeganathan et al.) filed May 31, 2017.

U.S. Appl. No. 15/610,233, filed by Juniper Networks, Inc. (Inventors: Jeganathan et al.) filed May 31, 2017.

Extended Search Report from counterpart European Application No. 18197733.1, dated Jan. 10, 2019, 7 pp.

Manav et al., "Advertising Multiple NextHop Routes in BGP, draft-bhatia-bgp-multiple-next-hops-01.txt," Internet Draft, Network Working Group, Aug. 2006, 18 pp.

Response to the Extended Search Report filed dated Apr. 8, 2019, from counterpart European Application No. 18197733.1, filed Oct. 3, 2019, 10 pp.

* cited by examiner (G1, G2)   AFI0

(G3, G2)   AFI0

(G3, G4)   AFI1

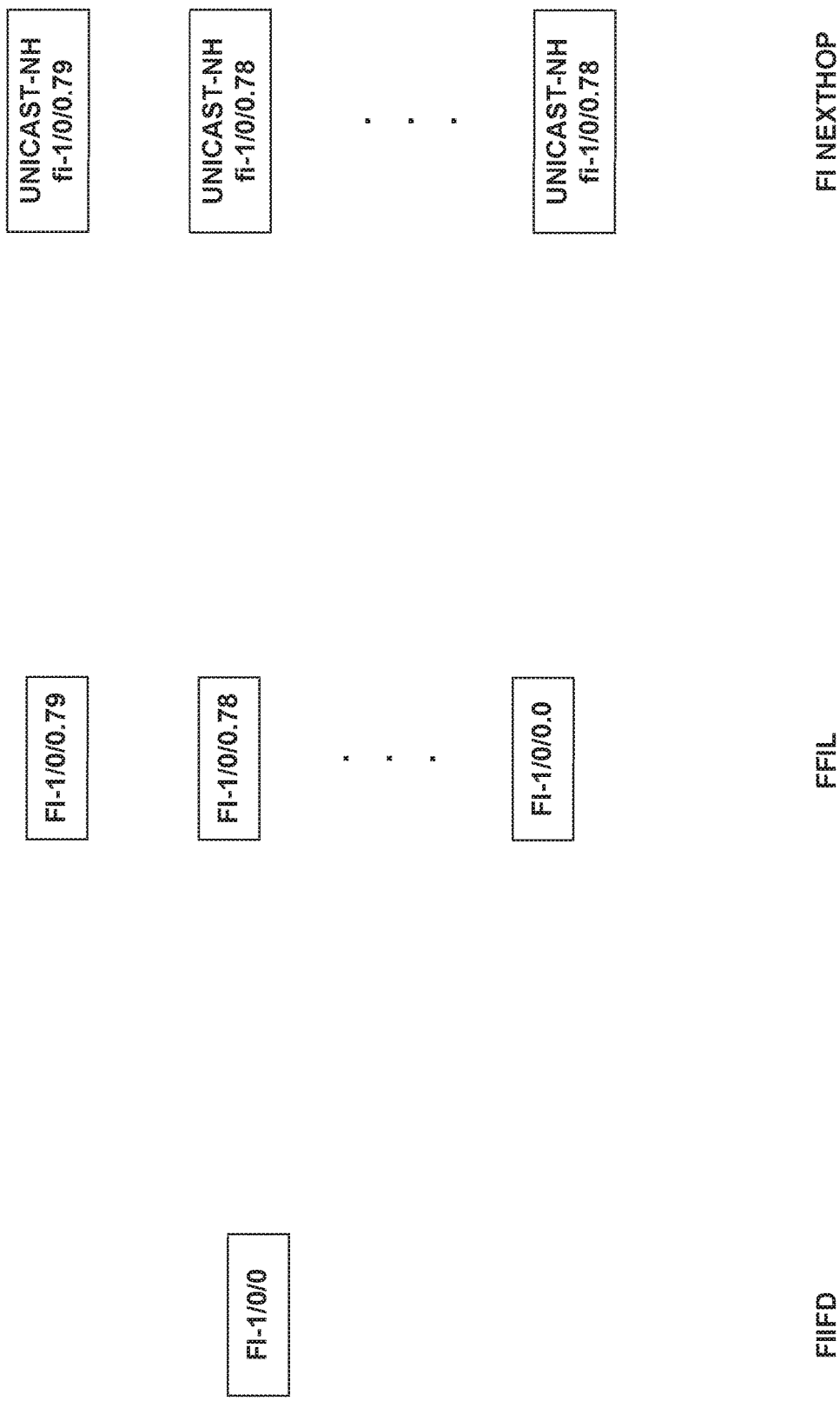

… … …

CONNECTING VIRTUAL NODES IN A NETWORK DEVICE USING ABSTRACT FABRIC INTERFACES

This application claims the benefit of U.S. Provisional Application No. 62/565,550, filed Sep. 29, 2017, the entire contents of which are incorporated by reference herein.

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

Routers may include one or more packet processors, e.g., packet forwarding engines, and a switch fabric. Packet processors may receive and send data via interface cards. The switch fabric provides an interconnect mechanism for forwarding data between the packet forwarding engines for transmission over a network, e.g., the Internet. In some examples, a router or switching device may employ a distributed, multi-stage switch fabric architecture, in which network packets traverse multiple stages of the switch fabric located in distributed packet processors of the router to travel from an ingress point of the switch fabric to an egress point of the switch fabric.

Routers use routing protocols to exchange routing information. Routers often maintain the routing information in the form of one or more routing tables or other data structures. Routers may generate and maintain forwarding information in accordance with the routing information. The forwarding information associates network routes with specific forwarding next hops and corresponding interface ports of the router. The forwarding information may, in some examples, be a subset of the information contained within routing information. The process of generating the association of the interface ports with the next hops in forwarding information is generally referred to as route resolution.

SUMMARY

In general, this disclosure describes techniques for creating internal connections between virtual nodes in a single network device chassis. Node virtualization virtualizes a single-chassis network device into multiple network nodes (virtual nodes) by partitioning hardware resources of the single-chassis network device among the virtual nodes. The techniques provide a mechanism for setting up connections to route and forward traffic across the virtual nodes. Setting up such connections may be challenging, as the underlying network connectivity between virtual nodes is a broadcast fabric medium of fabric serializer/deserializer link connectivity.

This disclosure describes an architecture that defines how the virtual nodes will be connected so that traffic that may be routed across the virtual nodes. In this architecture, virtual interfaces called abstract fabric interfaces can be created between virtual nodes, allowing the virtual nodes to route and forward traffic between them. A management component executing on the single-chassis network device configures a virtual node with an abstract fabric interface having, as a destination address, identifiers of packet processors assigned to the virtual node on the other end of the abstract fabric interface. An underlay network is pre-created by the management component of the single-chassis network device using the fabric links at the packet processor. When the management component creates and connects an abstract fabric interface on the virtual nodes, the management component forms an overlay network and attaches the overlay network to the underlay network, to connect the virtual nodes. However, users of the network device, external devices, and routing protocols will not view the abstract fabric interface as an overlay interface, but as a regular Ethernet interface (e.g., a Gigabit Ethernet interface). The techniques described herein may allow for connections between virtual nodes without requiring adding external ports for the connections. In this way, node virtualization and abstract fabric interfaces may allow for reduced capital expenses.

In one example aspect, a method includes receiving, by a network device, configuration information creating an abstract fabric interface to connect a first virtual node of the network device to a second virtual node of the network device, and, in response to receiving the configuration information, associating, by the network device, the abstract fabric interface with a list of identifiers of each of a plurality of packet processors of the network device assigned to the second virtual node. The method further includes, in a control plane of the network device, creating a route at the first virtual node, the route having the abstract fabric interface as a forwarding next hop, in a forwarding plane of the first virtual node, programming the forwarding plane to attach the list of identifiers to the forwarding next hop, receiving network traffic at the first virtual node, and based on the forwarding next hop, forwarding the network traffic from the first virtual node to the second virtual node via the abstract fabric interface.

In some example aspects, a single-chassis network device includes a plurality of packet processors, a first virtual node configured to forward packets using a first subset of the plurality of packet processors, a second virtual node configured to forward packets using a second subset of the plurality of packet processors, the second subset being distinct from the first subset, and a management component. The management component is configured to receive an indication of configuration information creating an abstract fabric interface to connect a first virtual node of the network device to a second virtual node of the network device, and, in response to receiving the indication, associate the abstract fabric interface with a list of identifiers of each of a plurality of packet processors of the network device assigned to the second virtual node. The management component is further configured to create a route at the first virtual node, the route having the abstract fabric interface as a forwarding next hop, and program a forwarding plane of the first virtual node to attach the list of identifiers to the forwarding next hop. The first virtual node is configured to receive network traffic and, based on the forwarding next hop, forward the network traffic to the second virtual node via the abstract fabric interface.

In some example aspects, a computer-readable storage medium comprising instructions for causing one or more programmable processors of a network device to receive an indication of configuration information creating an abstract fabric interface to connect a first virtual node of the network device to a second virtual node of the network device, in response to receiving the indication, associate the abstract fabric interface with a list of identifiers of each of a plurality of packet processors of the network device assigned to the second virtual node, create a route at the first virtual node, the route having the abstract fabric interface as a forwarding next hop, program a forwarding plane of the first virtual node to attach the list of identifiers to the forwarding next hop, receive network traffic at the first virtual node, and, based on the forwarding next hop, forward the network traffic to the second virtual node via the abstract fabric interface.

The details of one or more examples are set forth in the accompanying drawings and the description below. Other features, objects, and advantages will be apparent from the description and drawings, and from the claims.

BRIEF DESCRIPTION OF DRAWINGS

FIG. 15 is a block diagram illustrating the P2P IFL and next hop (NH) relationship.

Like reference characters denote like elements throughout the figures and text.

DETAILED DESCRIPTION

Figure 1A:
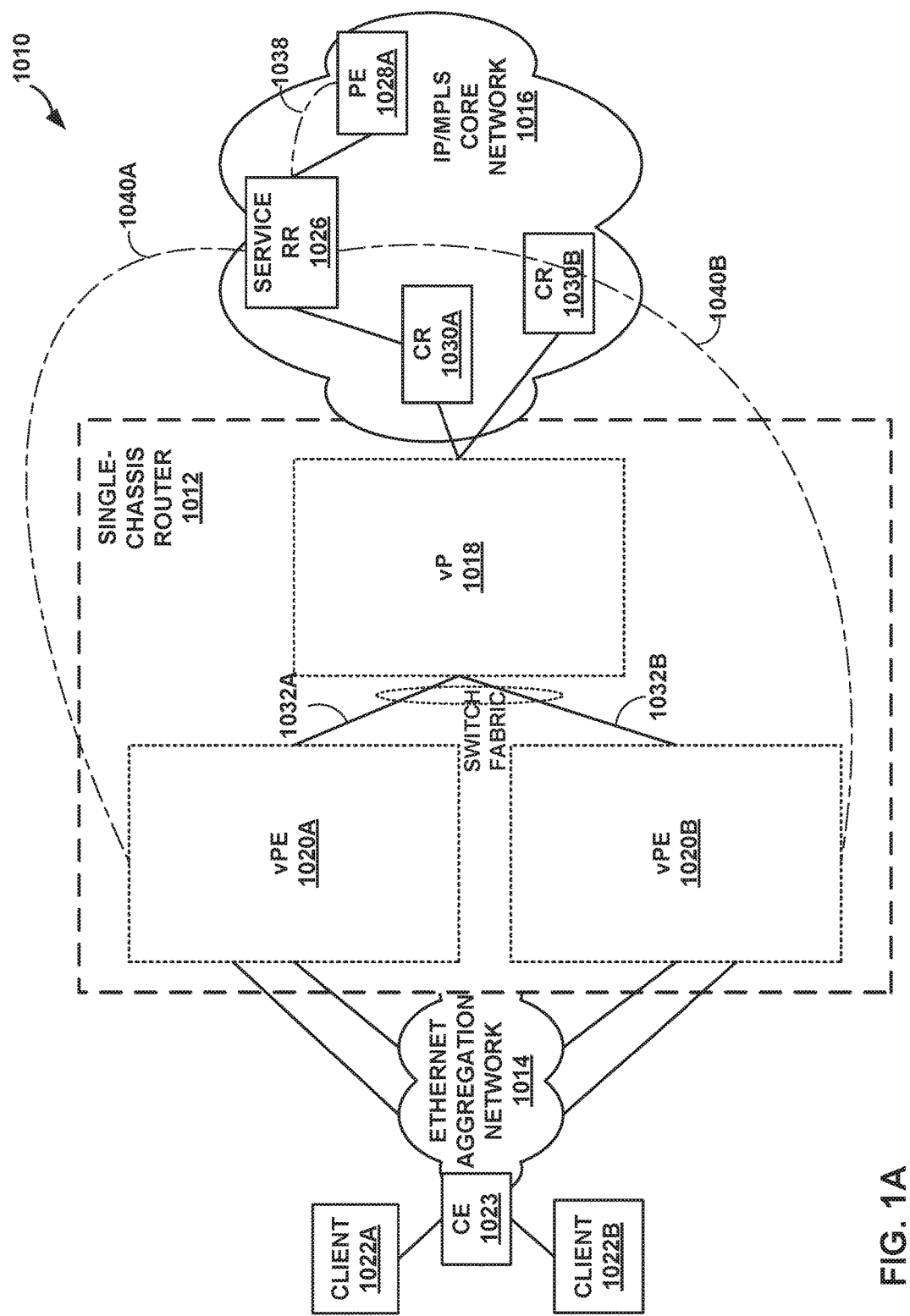
FIG. 1A is a block diagram illustrating an example network environment that includes a logical view of a single-chassis router configured in accordance with techniques described in this disclosure.

FIG. 1A is a block diagram illustrating an example network environment 1010 that includes a logical view of a single-chassis router configured in accordance with techniques described in this disclosure. For purposes of example, the techniques of this disclosure are described with respect to a simplified network environment 1010 of FIG. 1A in which single-chassis router 1012 communicates with core routers 1030A-1030B ("core routers 1030") to provide client devices 1022A-1022B ("client devices 1022") with access to services provided by devices in Internet Protocol (IP)/Multi-Protocol Label Switching (MPLS) core network 1016. Single-chassis router 1012 may exchange routing information with core routers 1030A-1030B to maintain an accurate representation of the topology of network environment 1010. Single-chassis router 1012 includes virtual provider edge (vPE) nodes 1020A-1020B ("vPEs 1020") and virtual core router (vP) node 1018, which are cooperative virtual routing components operating as multiple distinct nodes from the perspective of network devices external to single-chassis router 1012.

In accordance with the techniques of this disclosure, single-chassis router 1012 is a router having a single physical chassis, which is virtualized into multiple virtual network nodes (referred to herein as Guest Network Functions (GNFs)) by portioning hardware resources of the router, such as packet processors (e.g., packet forwarding engines (PFEs)). Single-chassis router 1012 includes multiple routing components (e.g., routing processes) and packet processors (e.g., PFEs) that are physically coupled and configured to operate as separate logical routers. To core routers 1030 and CE router 1023 of network environment 1010, single-chassis router 1012 appears as multiple routing devices, specifically, virtual PE (vPE) router 1020A, vPE router 1020B, and virtual provider (vP) router 1018. For example, although single-chassis router 1012 includes a single chassis, from the perspective of core routers 1030, single-chassis router 1012 has multiple externally-advertised network addresses and maintains multiple peer routing sessions for each routing protocol maintaining peer routing sessions with each of the core routers 1030.

Node virtualization allows for partitioning a physical router into multiple network elements. A network element is a combination of control plane (routing plane) and data plane (forwarding plane), with dedicated FPC's assigned to the network element. The forwarding planes would contain one more FPC resources, and along with the associated control plane, the network elements act as distinct routers. Some potential advantages of node virtualization may include the ability to run multiple types of network device, isolate functions and services, and streamline capital expenses.

Figure 1B:
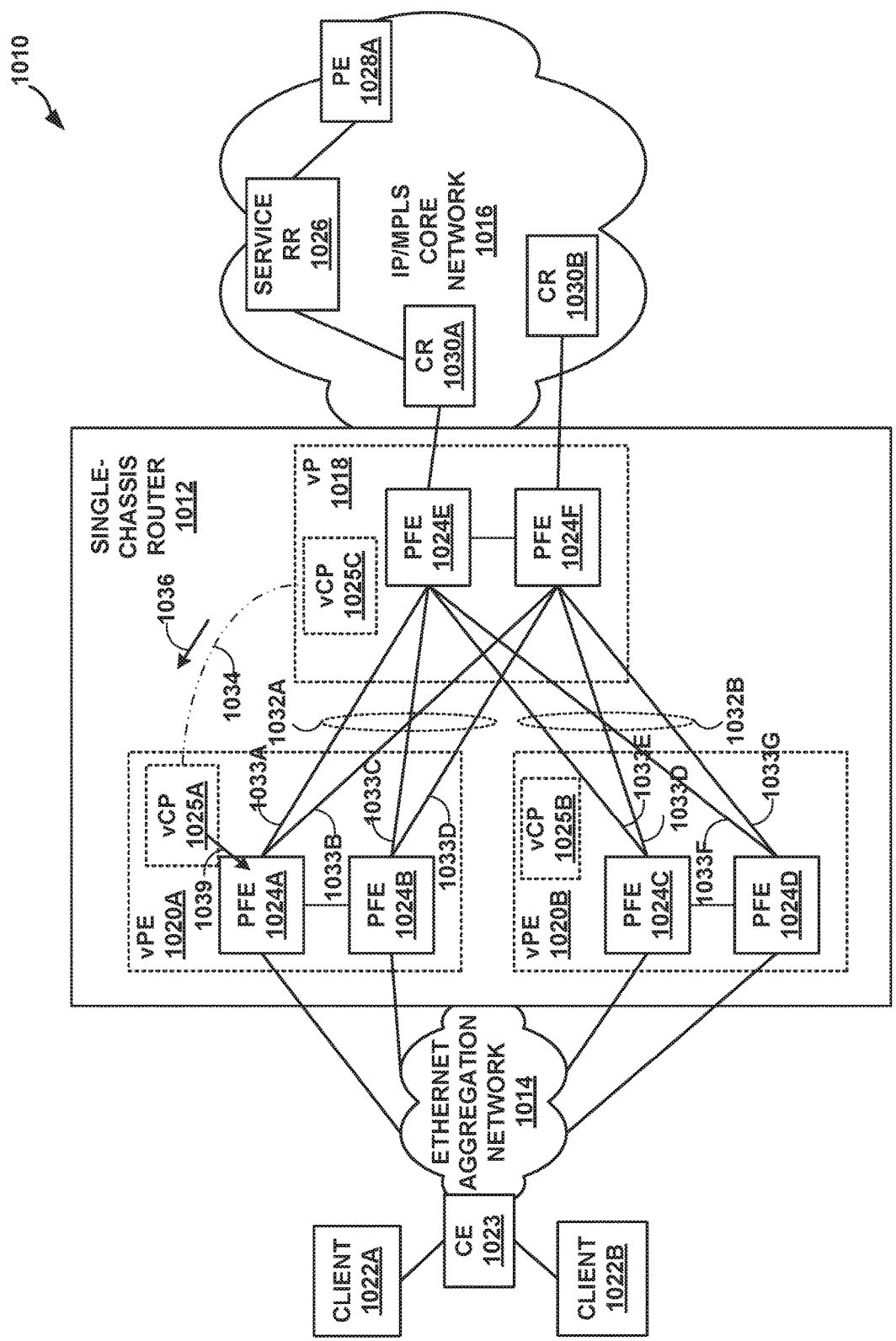
FIG. 1B is a block diagram illustrating the example network environment of FIG. 1A in further detail, in accordance with techniques described in this disclosure.

In the example of FIGS. 1A-1B, vP 1018 is a shared uplink that connects vPEs 1020A-1020B to IP/MPLS core network 1016. Shared uplink may be implemented using an MPLS LSR GNF instance for vP 1018. vPEs 1020 share uplink bandwidth.

The configuration of network environment 1010 illustrated in FIG. 1A is merely an example. Although not illustrated as such, IP/MPLS core network 1016 may be coupled to one or more networks administered by other providers, and may thus form part of a large-scale public network infrastructure, e.g., the Internet. Ethernet aggregation network 1014 may be viewed as an access network to the Internet. Service provider network 6 may provide computing devices coupled to client devices 1022A-1022B ("client devices 1022") with access to the Internet, and may allow the computing devices within customer networks (not shown) to communicate with each other. In another example, IP/MPLS core network 1016 may provide network services within the core of the Internet. In either case, IP/MPLS core network 1016 may include a variety of network devices (not shown) other than single-chassis router 1012, service route reflector (RR) 1026, provider edge (PE) router 1028A, and core routers 1030, such as additional routers, switches, servers, or other devices.

Client devices 1022 may be access nodes coupled to customer networks and subscriber devices. Client devices 1022 are clients of services provided by PE router 1028A via service RR 1026. In this example, service provider network includes client devices 1022 and customer edge (CE) router 1023 that provide subscriber devices with access to aggregation network 1014. In some examples, CE router 1023 may comprise a router that maintains routing information between subscriber devices and aggregation network 1014. CE router 1023, for example, may include Broadband Remote Access Server (BRAS) functionality to aggregate output from one or more client devices 1022 into a higher-speed uplink to aggregation network 101.4

Client devices 1022 may be devices associated with one or more customer networks (not shown) coupled to customer edge (CE) router 1023. In some examples, client devices 1022 may include computing devices, such as personal computers, laptop computers, handheld computers, workstations, servers, switches, printers, customer data centers or other devices, for example. In other examples, client devices 1022 may be endpoint devices such as a switch, a router, a gateway, or another terminal that operates as a demarcation point between customer equipment, such as subscriber devices, and service provider equipment. In one example, client devices 1022 may comprise a digital subscriber line access multiplexer (DSLAM) or other switching device. For example, client devices 1022 may be connected to one or more wireless radios or base stations (not shown) to wirelessly exchange packetized data with subscriber devices. Client devices 1022 may comprise a switch, a router, a gateway, or another terminal that aggregates the packetized data received from the wireless radios to CE router 1023. In some examples, aggregation network 1014 may include an optical access network. For example, CE router 1023 may comprise an optical line terminal (OLT) connected to one or more client devices 1022 or optical network units (ONUS) via optical fiber cables.

Between two GNFs in single-chassis router 1012, one logical layer-3 link is provisioned that is visible to devices external to single-chassis router 1012. For example, in FIGS. 1A and 1B, these are abstract fabric interface (AFI) links 1032A-1032B ("AFI links 1032"). Each of AFI links 1032 are layer-3/layer-2 logical link constructs. AFI provides GNF to GNF connectivity. AFI links 1032 bundle those fabric interconnects that connect the same GNF. AFI provides a single logical link connectivity between the GNF, and could have many layer-1, layer-2, or layer-3 fabric bundling within, depending on implementation.

Unlike an aggregate interface that contains child interfaces, an AFI interface does not have any notion of child interfaces under it, but rather is a stand-alone interface. Physical interfaces will be denoted using the term 'ifd', and logical interfaces will be denoted using the term 'ifl'. An AFI IFD is created on a virtual node (GNF) whenever the GNF is connected to peer GNF. In other words, whenever two GNFs are connected to each other, AFI's are created on both the GNFs. Note that GNFs (and peer GNFs) are all within a single chassis, and they are not visible outside the chassis. In some examples, there are also fabric interface (FI) IFDs created on the GNFs, including the FI ifls, used for P2P connection. In some examples, FI ifls may not be customer configurable. One example use case for FI ifls is for an OFP (i.e. Optimal Fabric Path) feature.

The P2P ifls would be pre-created as part of underlay network creation, whereas the interface routes on those ifls will be configured based on the AFI connectivity configuration that comes from a Base System (BSYS): In some examples, P2P ifls are created even without the AFI peer connectivity on the system.

The purposes of AFI are multi-fold: Routing Control/Management traffic between the GNF's; Routing Control/Management traffic between the GNF and SU; and First class Ethernet IFD, for example. The purposes of FI are primarily: Routing data traffic to a particular PFE of a GNF (or 'SU'), and Special ifl(P2P connection) support across PFEs, when optimal fabric path (OFP) functionality is enabled. In some examples, GNFs may communicate OFP information 1036 via a BGP session 1034 between virtual control planes of the GNFs, as described in detail in U.S. application Ser. No. 15/610,233, filed May 31, 2017, the entire contents of which are incorporated by reference herein.

In the example of FIG. 1B, AFI links includes fabric interconnects 1033A-1033D, and AFI 1032B includes fabric interconnects 1033E-1033G (collectively, "fabric interconnects 1033"). Abstract fabric interfaces may alternatively be referred to as "aggregate fabric interfaces." Fabric interconnects terminate at fabric interfaces of one of PFEs 1024. In some examples, the fabric interfaces have assigned identifiers that are not generally advertised to devices external to single-chassis router 1012. The fabric interconnects 1033 are modeled as point-to-point Ethernet links between a pair of PFEs 1024. AFI and fabric interfaces (FIs) emulate point-to-point interfaces. AFI link 1032 end-points have user-configured IP-addresses. From a protocols perspective, AFI link 1032 end-points are used for control-session termination, and fabric interfaces are used as next hops that are exchanged in a control-session (e.g., OFP session 1034) for advertising optimal fabric paths within single-chassis router 1012.

In some example implementations, fabric interconnect end-points (i.e., fabric interfaces) have auto-configured IP addresses. In other example implementations, IP addressing is not needed for fabric interfaces; rather, the fabric interfaces are unnumbered interfaces, and may be identified by a PFE identifier ("PFE-id") modeled as sub-network point of attachment (SNPA) or an MPLS label, for example. Fabric interface may be replaced with either "AFIx-node-ip-address, SNPA-id-for-pfe," or "AFIx-node-ip-address, MPLS-label-for-pfe," where SNPA-id or MPLSlabel are unique, locally-significant identifiers in the scope of the AFI. In some examples, the PFE-id may be used as the SNPA/label and is unique across all AFIs in the single chassis router. The MultiNexthop attribute described herein supports signaling the fabric interface identifier as IP address, SNPA, or label, as a way to signal a "numbered-interface as next hop" or "unnumbered-interface as next hop" in BGP. Various examples are described herein with respect to fabric interface identifiers as IP addresses, but unnumbered interface identifiers may likewise be used in such examples. In some examples, e.g., where optimal fabric path functionality is not needed, identifiers may not be assigned to fabric interfaces.

In some examples, each of the bundled links and the member links may natively support IPv4, IPv6 and MPLS; that is, IP routing protocols and MPLS signaling protocols run natively on the member links 1033 and bundled AFI links 1032. The data traffic may be unicast and/or multicast. The AFI links 1032 may provide similar functionalities as provided by Ethernet interfaces, such as statistics and administrative control, for example. The AFI links emulated over the fabric interconnects may support Ethernet encapsulation, for example. The All connectivity (peers) and IP addresses of the AFIs may be user provisioned. The local and remote IP address of an AFI should be in the same subnet and should be unique across the network. In some examples, identifiers for the member-FI interfaces may be derived from AFI-connectivity and assigned to AFI. This membership association would be done by an administrative virtual machine of single-chassis router 1012 (not shown). The AFI links 1032 may also have cumulative bandwidth (link-speed) based on the bandwidth of the member fabric interconnects 1033, and may be user configurable.

As described herein, in some examples, FI creation may be as follows. 'fi' IFDs may be created per PFE (also known as Forwarding element(FE)) on all the line cards on the system by a chassis daemon of GNF, (for example pfe-x/y/z, lc-x/y/z etc. are created per PFE on each line card). fi-X/Y/Z—'X' represents Slot, 'Y' represents local PFE number, and 'Z' represents the actual FE number. In other examples, FI IFDs may not be created.

AFI creation is as follows. AFI IFD's are created on GNFs based on the BSYS configuration information that is sent to the GNFs. As many AFI IFDs can be created on the GNF. In order to connect two GNF's or to a Shared Uplink, an AFI IFD has to be created on both the ends of GNF and stitched together through a CLI config (as described below) on BSYS. BSYS will push the config onto the GNFs that contains the AFI info and the GNFs FTC resources.

BSYS will also send afi-id (e.g., gen-id or link-id or serial-num or index-num) along with AFI config. This id will serve as the basis to connect/reach the remote GNF at the PFE. Once the AFI config reaches the GNFs or SU, a management component on the GNF control plane (e.g., chassis daemon) will create AFI IFD. This IFD should be seen by Kernel, PFE, and other daemons on the routing engine (RE). The RE daemons, the kernel, and the PFE see the AFI as a P2P connection. As part of the IFD creation, the afi-id will be filled in, so receivers like PFE can utilize the afi-id. The AFI-ID is associated with an FE-ID(PFE-ID) list.

Destination properties of the AF PFE-ID list may include, for example: supports weights, supports balances, and supports local bias. AF bandwidth is the bandwidth of the peer AFI total linecards. AF supports Operations, Administration, and Maintenance (OAM) because the kernel can use the PFE-ID list and inject packets to all destinations. In this manner, the management component manages the configuration of interconnections and the process of configuring the switch fabric between virtual routers in the single-chassis router.

FIG. 1B is a block diagram illustrating the example network environment of FIG. 1A in further detail, in accordance with techniques described in this disclosure. In the example of FIG. 1B, each of GNFs 1018, 1020 includes one or more PFEs 1024A-1024F ("PFEs 1024"). Individual PFEs 1024 are associated with a particular GNF and are not shared among multiple GNFs. GNFs share forwarding resources at flexible programmable integrated circuit (PIC) concentrator (FPC) granularity. Each GNF's control plane (vCP) 1025A-1025C ("vCPs 1025") instantiates with virtual machine (VM) technology. The vCP 1025 either could be within the routing engine (RE) of single-chassis router 1014 or outside the RE, such as in a physically separate network controller. Each GNF could serve the role of different network functions, such as Internet service provider edge (PE), Virtual Private Network (VPN) service PE (vPE) and Multiprotocol Label Switching (MPLS) Label Switching Router (LSR) (vP). Apart from these GNFs, in some examples single-chassis router 1014 may also include an administrative VM instantiated for shared resources management (e.g., a management plane, not shown in FIGS. 1A-1B).

In one example, assume vPE 1020A and vPE 1020B each provide MPLS-based VPN services, and CE 1023 connects to PFE 1024A. Assume also that each of vPE 1020A and vPE 1020B connects to vP 1018 with fabric equal cost logical paths via PFE 1024E and PFE 1024F. When a packet comes to vP 1018 from IP/MPLS core network 1016 and destined for CE 1023, vP 1018 may send data traffic to either PFE 1024A or PFE 1024B based on ECMP load balancing.

In some examples, the techniques of this disclosure may be applied to GNFs may not be in a single physical chassis, but may be multiple nodes in separate physical chassis that operate as if in a single chassis.

Figure 2:
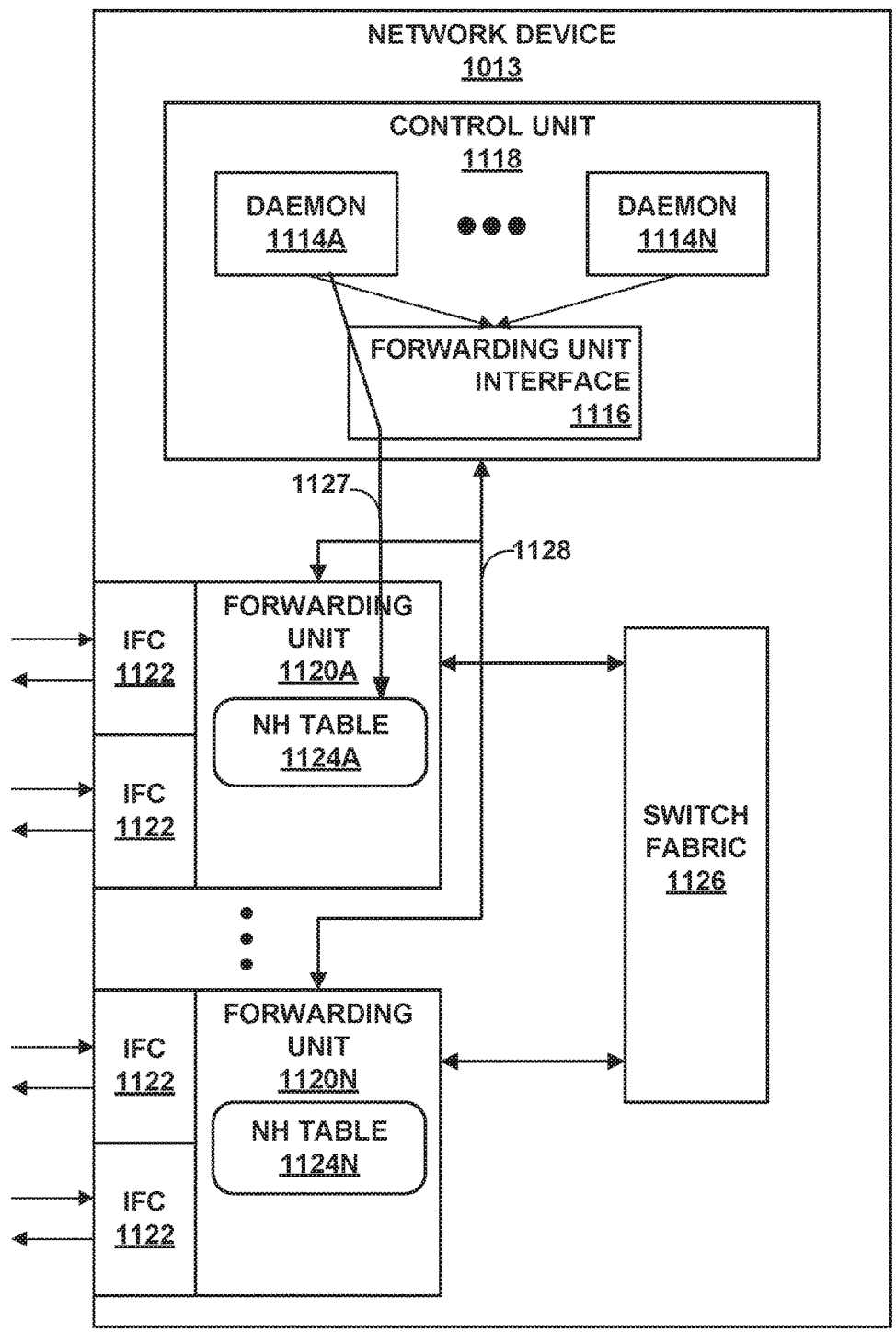
FIG. 2 is a block diagram illustrating an example network device configured in accordance with techniques described in this disclosure.

FIG. 2 is a block diagram illustrating an example network device 1013 (e.g., single-chassis router 1012 of FIGS. 1A-1B), configured in accordance with the techniques of this disclosure. Network device 1013 may include multiple virtual nodes operating as, for example, virtual provider edge or virtual customer edge routers, virtual autonomous system border routers (ASBRs), virtual area border routers (ABRs), or another type of network device, such as a virtual switch.

In this example, network device 1013 includes a control unit 1118 that provides control plane functionality for network device 1013. Control unit 1118 may be distributed among multiple entities, such as one or more routing units and one or more service cards insertable into network device 1013. In such instances, network device 1013 may therefore have multiple control planes. In some examples, each virtual routing node of network device 1013 may have its own virtual control plane, e.g., vCPs 1025 of FIG. 1B.

Network device 1013 also includes a plurality of forwarding units 1120A-1120N ("forwarding units 1120") and a switch fabric 1126, that together provide a forwarding plane for forwarding and otherwise processing subscriber traffic. Control unit 1118 may be, for example, any of vCPs 1025 of FIGS. 1A-1B, and forwarding units 1120 may, for example, house any of PFEs 1024.

Forwarding units 1120 receive and send data packets via interfaces of interface cards 1122A-1122N ("IFCs 1122") each associated with a respective one of forwarding units 1120. Each of forwarding units 1120 and its associated ones of IFCs 1122 may reside on a separate line card for single-chassis router 1012 (not shown). Example line cards include flexible programmable integrated circuit (PIC) concentrators (FPCs), dense port concentrators (DPCs), and modular port concentrators (MPCs). Each of IFCs 1122 may include interfaces for various combinations of layer two (L2) technologies, including Ethernet, Gigabit Ethernet (GigE), and Synchronous Optical Networking (SONET) interfaces. In various aspects, each of forwarding units 1120 may comprise more or fewer IFCs. Switch fabric 1126 provides a high-speed interconnect for forwarding incoming data packets to the selected one of forwarding units 1120 for output over a network. Switch fabric 1126 may include multiple fabric links (not shown), such as fabric links 1033 of FIG. 1B.

In some examples, switch fabric 1126 may be a distributed, multi-stage switch fabric architecture, in which network packets traverse multiple stages of the switch fabric located in distributed forwarding components of the router to travel from an ingress point of the switch fabric to an egress point of the switch fabric. As one example, switch fabric 1126 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

Control unit 1118 is connected to each of forwarding units 1120 by internal communication link 1128. Internal communication link 1128 may comprise a 100 Mbps or 1 Gbps Ethernet connection, for instance. Daemons 1114A-1114N ("daemons 1114") executed by control unit 1118 are user-level processes that may run network management software, execute routing protocols to communicate with peer routing devices, execute configuration commands received from an administrator, maintain and update one or more routing tables, manage subscriber flow processing, and/or create one or more forwarding tables for installation to forwarding units 1120, among other functions. Daemons 1114 may include one or more of a command line interface daemon, management daemon (chassis daemon), and routing protocol daemon, for example. In some examples, one of daemons 1114 may comprise a client for an Authentication, Authorization, and Accounting (AAA) protocol, such as a Remote Authentication Dial-In User Service (RADIUS) client.

Control unit 1118 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 1118 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Forwarding unit 1120 process packets by performing a series of operations on each packet over respective internal packet processing paths as the packets traverse the internal architecture of single-chassis router 1012. Operations may be performed, for example, on each packet by any of a corresponding ingress interface, an ingress forwarding unit 1120, a transit forwarding unit 1120, an egress forwarding unit 1120, an egress interface or other components of single-chassis router 12 to which the packet is directed prior, such as one or more service cards. The result of packet processing determines the way a packet is forwarded or otherwise processed by forwarding units 1120 from its input interface on one of IFCs 1122 to its output interface on one of IFCs 1122. A particular packet may be processed by multiple forwarding units 1120, in some examples.

The example of FIG. 2 shows forwarding unit 1120A as storing a next hop (NH) table 1124A. Forwarding unit interface 1116 presents an interface by which daemons 1114 may program forwarding units 1120 for directing packet flow forwarding. Daemons 1114 direct forwarding units 1120 via forwarding unit interface 1116 to install or update entries to NH tables 1124. Forwarding unit interface 1116 may comprise one or more user- or kernel-level libraries, programs, toolkits, application programming interfaces (APIs) and may communicate control and data messages to forwarding units 1120 via internal communication link 1128 using sockets, for example.

For example, in accordance with the techniques of this disclosure, one of daemons 1114 may cause forwarding unit interface 1116 to directs forwarding units 1120 to generate an IFL 1171 for the packet flow to specify a list of all member fabric links of an aggregated fabric link as a next hop for packets destined for the destination prefix. In the illustrated example, daemon 1114A directs forwarding units 1120 to install the IFL list using IFL messages 1127. IFL messages 1127 specify a route and an IFL list to install for the route.

The architecture of single-chassis router 1012 illustrated in FIG. 2 is shown for example purposes only and should not be limited to this architecture. In other examples, single-chassis router 1012 may be configured in a variety of ways. In one example, some of the functionally of control unit 1118 may be distributed within IFCs 1122. Control unit 1118 may be implemented solely in software, or hardware, or may be implemented as a combination of software, hardware, or firmware. For example, control unit 1118 may include one or more processors which execute software instructions. In that case, the various software modules of control unit 1118 may comprise executable instructions stored on a computer-readable storage medium, such as computer memory or hard disk.

Figure 3:
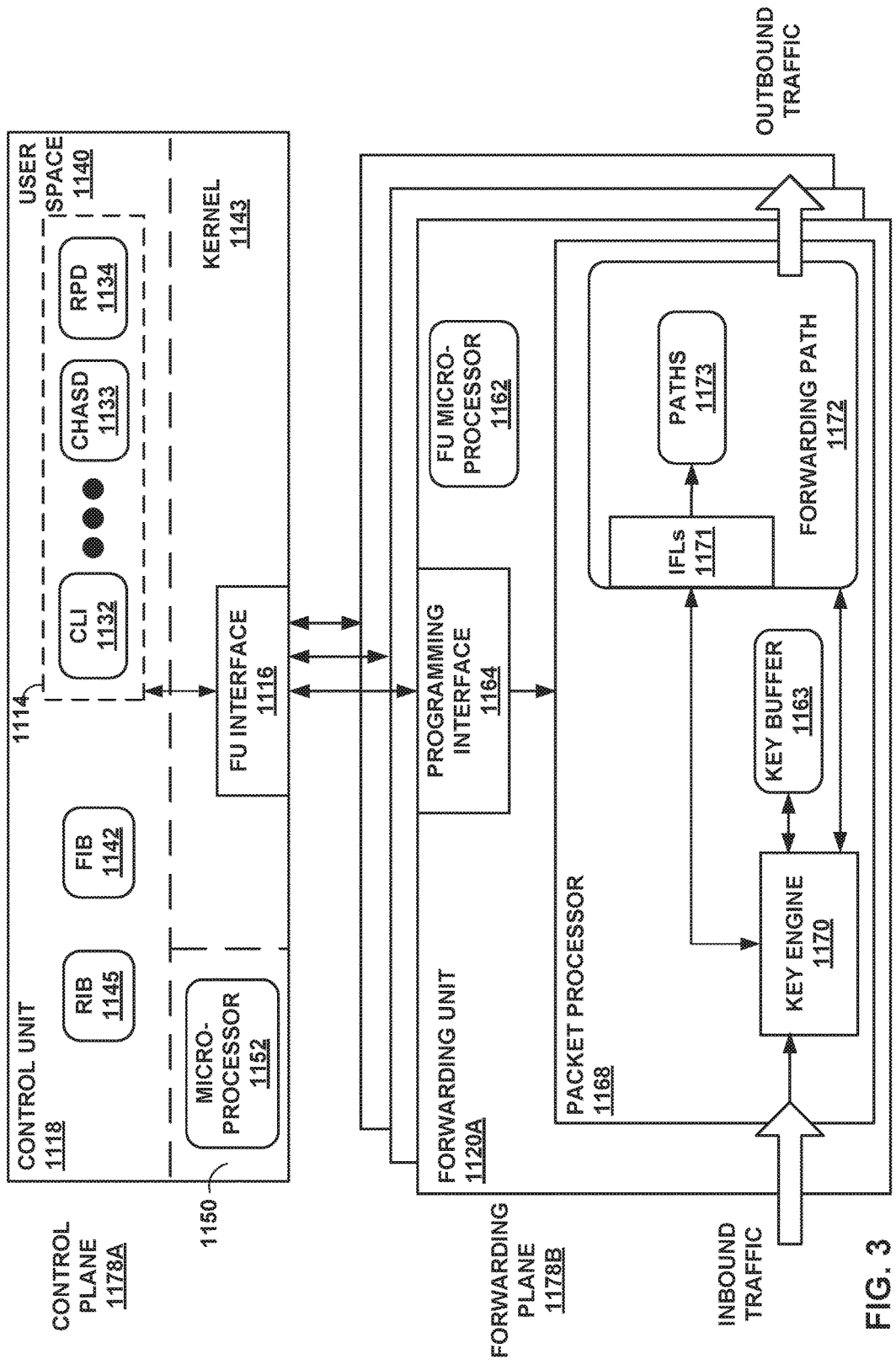
FIG. 3 is a block diagram illustrating example instances of a control unit and packet processor of FIG. 2 in further detail.

FIG. 3 is a block diagram illustrating example instances of control unit 1118 and forwarding unit 1120A of forwarding units 1120 of FIG. 2 in further detail. In this example, control unit 1118 provides a control plane 1178A operating environment for execution of various user-level daemons 1114 (software processes) executing in user space 1140. Daemons 1114 in this example include command-line interface daemon 1132 ("CLI 1132"), chassis daemon 1133 ("CHASD 1133"), and routing protocol daemon 1134 ("RPD 1134"). In this respect, control plane 1178A may provide routing plane, service plane, and management plane functionality for single-chassis router 112. Various instances of control unit 1118 may include additional daemons 1114 not shown in FIG. 3 that perform other control, management, or service plane functionality and/or drive and otherwise manage forwarding plane functionality for single-chassis router 1012. Control unit 1118 may in some instances represent a control unit of a service card or a combination of control units of a routing component that provides routing plane functionality and a service card.

Daemons 1114 operate over and interact with kernel 1143, which provides a run-time operating environment for user-level processes. Kernel 1143 may comprise, for example, a UNIX operating system derivative such as Linux or Berkeley Software Distribution (BSD). Kernel 1143 offers libraries and drivers by which daemons 1114 may interact with the underlying system. Forwarding unit interface 1116 of kernel 1143 comprises a kernel-level library by which daemons 1114 and other user-level processes or user-level libraries may interact with programming interface 1164 of forwarding unit 1120A. Forwarding unit interface 1116 may include, for example, a sockets library for communicating with forwarding unit 1120A over dedicated network links.

Hardware environment 1150 of control unit 1118 comprises microprocessor 1152 that executes program instructions loaded into a main memory (not shown in FIG. 3) from storage (also not shown in FIG. 3) in order to execute the software stack, including both kernel 1143 and user space 1140, of control unit 1118. Microprocessor 1152 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 1134 executes one or more interior and/or exterior routing protocols to exchange routing information with other network devices and store received routing information in routing information base 1145 ("RIB 1145"). For example, RPD 1134 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RIB 1145 may include information defining a topology of a network, including one or more routing tables and/or link-state databases. RPD 1134 resolves the topology defined by routing information in RIB 1145 to select or determine one or more active routes through the network and then installs these routes to forwarding information base 1142 ("FIB 1142"). Typically, RPD 1134 generates FIB 1142 in the form of a radix or other lookup tree to map packet information (e.g., header information having destination information and/or a label stack) to next hops and ultimately to interface ports of interface cards associated with respective forwarding units 1120.

CLI 1132 provides a shell by which an administrator or other management entity may modify the configuration of single-chassis router 1012 using text-based commands. For example, CLI 1132 may receive commands for creating an abstract fabric interface between two virtual nodes (GNFs) of single-chassis router 1012. Single-chassis router 1012 may, in some examples, include an SNMP agent (not shown) that receives SNMP commands from a management entity to set and retrieve configuration and management information for single-chassis router 1012. Using CLI 1132 and/or the SNMP agent, for example, management entities may enable/disable and configure services, manage classifications and class of service for packet flows, install routes, enable/disable and configure rate limiters, configure traffic bearers for mobile networks, and configure interfaces, for example.

For example, an administrator or other management entity may use the following example CLI commands to set up an abstract fabric interface between two virtual nodes (GNFs) via CLI 1132:

root# edit chassis network-slices guest-network-functions
set gnf1 af2 peer-gnf af2 id 4
set gnf4 af2 peer-gnf af2 id 1

After receiving instructions to commit this configuration, CLI 1132 receives the following instructions to configure on the individual GNFs:

set interfaces af2 unit 0 family inet address 2.2.2.1/24
set interfaces af2 unit 0 family inet address 2.2.2.2/24

RPD 1134, CLI 1132, and chassis daemon 1133 in this example configure forwarding plane 1178B via forwarding unit interface 1116 to implement configured services, add/modify/delete routes, and may in some examples modify packet processing paths. Forwarding unit interface 1116 allows daemons 1114 to drive the installation and configuration of packet forwarding path 1172 of forwarding unit 1120A. Chassis daemon 1133 may, in response to CLI 1132 receiving commands creating an abstract fabric interface between two virtual nodes, configure forwarding unit 1120A to map packet flows to the abstract fabric interface. In some examples, forwarding unit interface 1116 includes an application programming interface (API) by which daemons 1114 may map packet flows to abstract fabric interfaces for forwarding.

Forwarding unit 1120A, in combination with other forwarding units 1120 of single-chassis router 1012, implements forwarding plane 1178B (also known as a "data plane") functionality to handle packet processing from ingress interfaces on which packets are received to egress interfaces to which packets are sent. Forwarding plane 1178B determines data packet forwarding through single-chassis router 1012, applies services, rate limits packet flows, filters packets, and otherwise processes the packets using service objects and lookup data installed by control plane 1178A to forwarding plane 1178B. Although FIG. 23 illustrates only forwarding unit 1120A in detail, each of forwarding units 1120 of single-chassis router 1012 comprises similar modules that perform substantially similar functionality.

Forwarding unit 1120A includes packet processor 1168 that executes forwarding path 1172 in accordance with techniques described herein. Packet processor 1168 is a forwarding component that may include, for example, one or more programmable application-specific integrated circuits. That is, in some examples, packet processor 1168 may be packet processing circuitry. Packet processor 1168 includes key engine 1170 that executes microcode (or "microinstructions") to control and apply fixed hardware components of packet processor 1168 to process packet "keys." A packet key includes packet fields and other parameters that determine a flow of packet processing for the packet along an internal processing path, such as paths 1173. Key engine 1170 includes key buffer 1163 to store packet field data for corresponding packets that the key engine is currently processing. Key buffer 1163 may also provide limited writable memory to which elements of the internal processing path may write to pass messages accessible by future elements. Some instances of packet processor 1168 may include a plurality of key engines each having an associated key buffer.

Internal forwarding path 1172 ("forwarding path 1172") of packet processor 1168 comprises programmable, executable microcode and fixed hardware components that determine the packet processing actions and other operations performed by key engine 1170. 1120A may store executable instructions of forwarding path 1172 in computer-readable storage media, such as static random access memory (SRAM). While illustrated within packet processor 1168, in some examples executable instructions of forwarding path 1172 may be stored in memory external to packet processor 1168 in forwarding unit 1120A.

In some aspects, forwarding path 1172 includes a next hop data structure to initiate processing. At the end of each processing step by key engine 1170, the result is a next hop that may specify additional processing or the termination of processing, for instance. In addition, next hops may specify one or more functions to be executed by key engine 1170 and/or one or more hardware elements to be applied (e.g., policers). Key engine 1170 may be associated with a result (or "lookup") buffer that stores results for executing next hops. For example, key engine 1170 may execute a lookup specified by a next hop and store the result of the lookup to the associated result buffer. The contents of a result buffer may affect the actions of the next hop in a next hop chain.

Logical interfaces 1171 ("IFLs 1171") is a table or other data structure that includes one or more logical interfaces. The number of IFLs 1171 may be limited in various implementations of forwarding unit 1120A due to memory restrictions, the rate at which forwarding unit microprocessor 1162 can establish paths in forwarding path 1172, the bandwidth between control unit 118 and forwarding unit 1120A, and the rate at which control unit 1118 can determine paths in forwarding path 1172. Each of IFLs 1171 is an interface to a processing path of paths 1173. Paths 1173 represents one or more processing paths for execution by key engine 1170 on key buffer 1163.

Forwarding unit microprocessor 1162 manages packet processor 1168 and executes programming interface 1164 to provide an interface for/to control unit 1118. Forwarding unit microprocessor 1162 may execute a microkernel to provide an operating environment for interfaces. Programming interface 1164 receives messages from control unit 1118 directing forwarding unit 1120A to configure logical interfaces 1171 and paths 1173 of forwarding path 1172.

In some examples, every physical interface device (or port) ("ifd") has a packet processor ID (e.g., PFE-ID (PFE identifier)). The PFE-ID provides an addressable point within a chassis. The term PFE-ID may be interchangeable with "PFE-SNPA". In some examples, chassis daemon 1133 derives the PFE-ID of an ifd from the PFE the ifd is associated with. In some examples, chassis daemon 1133 derives the PFE-ID from the PFE to which the fabric interface belongs and the fabric interface IFD. In some examples, this PFE-ID of IFD will be available through the rosock message (ifmedia:ifm_fe) for interested daemon consumption. Location is an abstraction for PFE-ID. In some examples, the PFE-ID also may help in hiding hardware details in RPD 1134. PFE-ID of the IFD will be referred as ifd-location.

In some examples, chassis daemon 1133 stores a mapping of PFE-ID to AFIs in a PFE mapping table (not shown) stored in key engine 1170 or forwarding path 1172. In some examples, chassis daemon 1133 derives the Ifl-location from underlying ifd-location. In some examples, chassis daemon 1133 learns the Ifd-location from the rtsock message(ifmedia:ifm_fe). All IFLs stacked on an ifd share the same location. In some examples, the fabric interface also gets the ifl-location. Ifl-location is associated with IFLs 1171.

In accordance with techniques of this disclosure, when single-chassis router 1012 is in node-virtualization mode, chassis daemon 1133, device configuration daemon (DCD) (software process), and forwarding unit 1120A will form an underlay network. This involves chassis daemon 1133 performing tasks such as: Local FI interface per PFE creation; P2P ifls creation; and forming underlay network at the PFE.

Overlay creation is as follows. When the AFI IFD are created by chassis daemon 1133, chassis daemon 1133 will form a relationship between the PFE and a peer GNF's PFE so any reachability on AFI goes via the construct created by chassis daemon 1133 at PFE to the remote PFEs. In some examples, AFI ifl's are created by a process similar to Ethernet WAN interfaces. In some examples, IFL will support all the L3 related features. Inet, Inet6, MPLS, ISIS, and CCC families will be supported. L2 families may also be supported in some examples.

Figure 4:
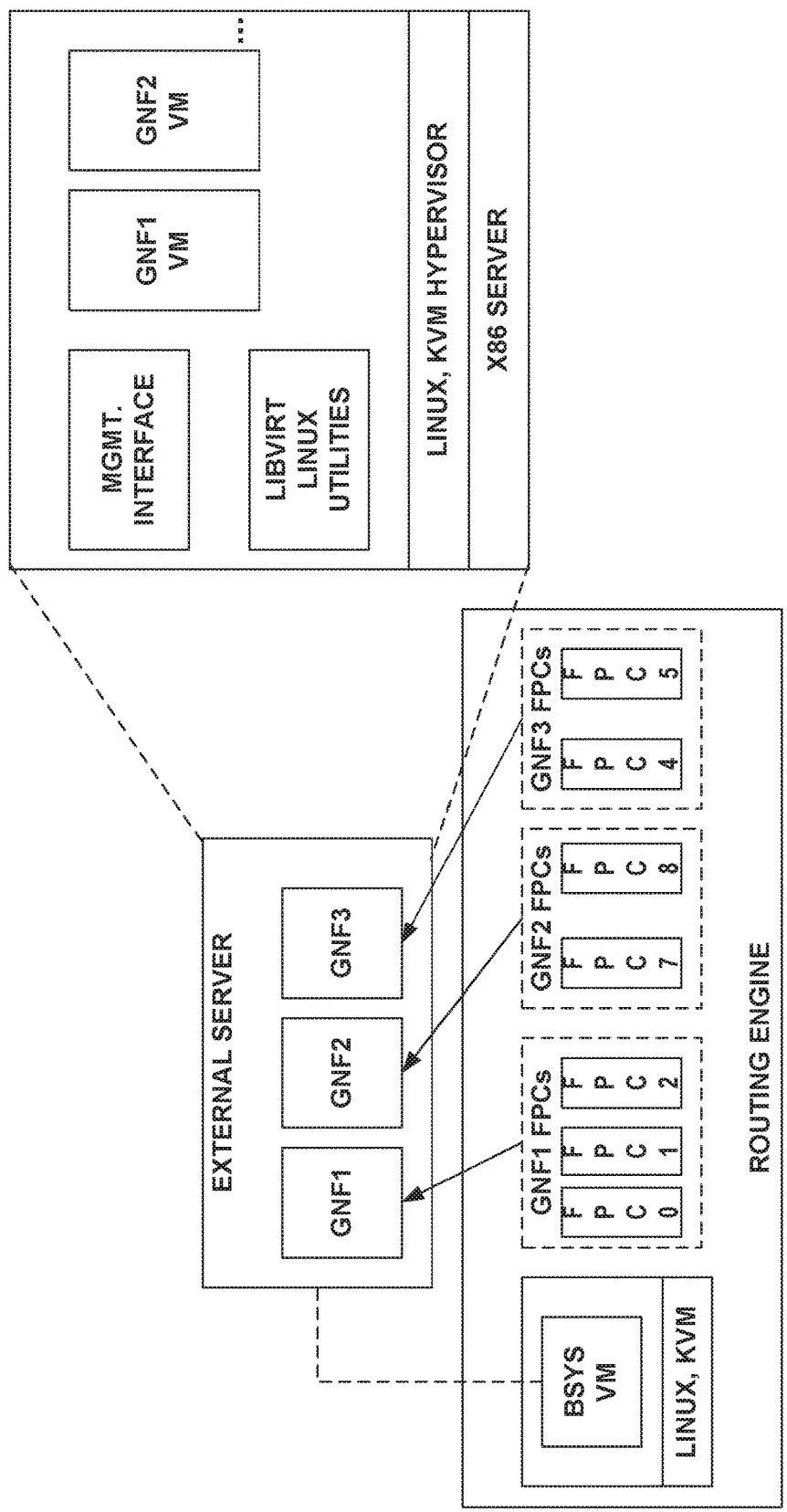
FIG. 4 is a block diagram illustrating a node virtualization layout, in accordance with techniques described in this disclosure.

FIG. 4 is a block diagram illustrating a node virtualization layout, in accordance with techniques described in this disclosure. Components of FIG. 4 may correspond to those in FIGS. 1-3. GNF (Guest Network Function) is the control plane, and the Controller is BSYS (Base SYStem) that runs natively on the chassis. With three GNFs (GNF1, GNF2 and GNF3) present in this layout, none of the GNFs is aware of the others, e.g., in the sense of having information about the hardware details of the others. Further, even the data plane GNF FPCs are unaware of other FPCs. For example, FPC0 of GNF1 has awareness of FPC1 and FPC2, but not FPC7 or FPC8 or FPC4 and FPC5 in that regard. In one example, GNF1 can be an Aggregation router, GNF2 a BNG router and GNF-3 a shared uplink, i.e., a core router.

An external server (e.g., controller) has multiple GNF control planes GNF1, GNF2, and GNF3, as shown. In the example of FIG. 4, the external server includes a management interface, linux utilities, GNF VMs, hypervisor. In some examples, some or all of control unit 1118 of FIGS. 2 and 3 may reside in a server external to the network device/single-chassis router. With Node Virtualization, creating distinct routers requires connectivity across these routers to communicate. Using ports explicitly for connectivity between the virtual router/GNFs is expensive because these ports would otherwise provide customer revenue. Instead, in accordance with the techniques of this disclosure, the system shown in FIG. 4 allows for configuration of logical abstract fabric (AF) interfaces on these routers that are user exposed and act as physical interfaces connecting a pair of routers. The underlying connectivity medium is just a fabric, and the fabric is any-to-any/broadcast connected model. Allowing connectivity is even more challenging when a single virtual router needs to communicate across different virtual routers simultaneously and not just to one. In other words, this means one virtual router should have point-to-point connectivity to each virtual router that it is connecting to. Using bottom-up approach, as described in further detail herein, the single-chassis router first forms an underlay and then defines an overlay that connects to the right underlay.

Figure 5:
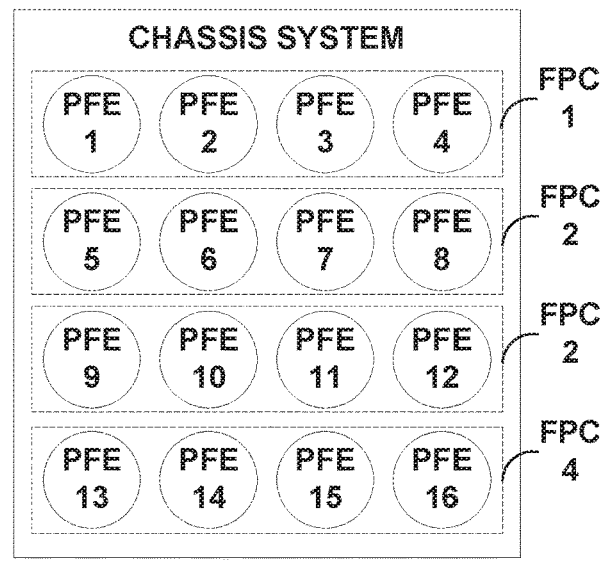
FIG. 5 is a block diagram illustrating a fabric medium having packet forwarding engine (PFE) endpoint vertices in a chassis system, in accordance with techniques described in this disclosure.
Figure 6:
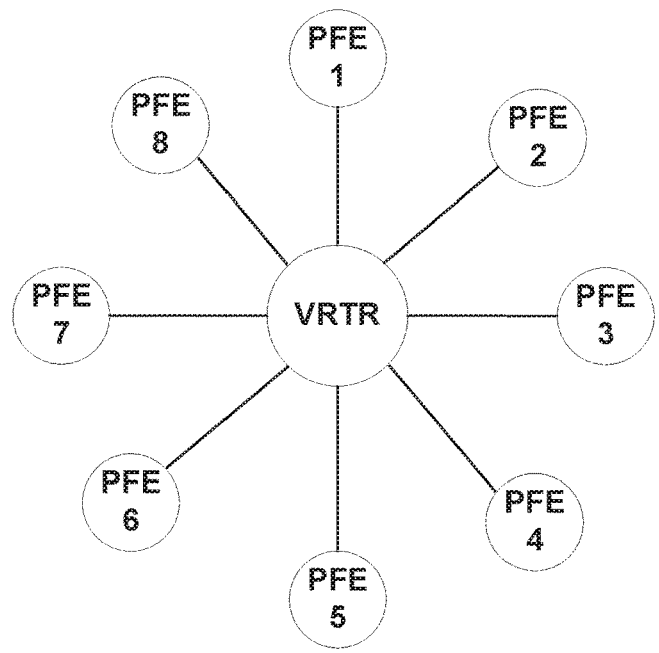
FIG. 6 is a block diagram illustrating logical associations of PFEs with a virtual router in forming an underlay network.

FIG. 5 is a block diagram illustrating a fabric medium having packet forwarding engine (PFE) endpoint vertices in a chassis system, in accordance with techniques described in this disclosure. FIGS. 5-6 illustrate forming an underlay network. The low-level fabric medium is a collection of PFE end points. The PFEs (the PFE count varies per line card type) in the system are pre-defined per line cards and may be both a source and a destination of traffic. The underlay network will form point-to-point connections across all PFEs in the system: Gx→GNF'x'. Considering the underlay network as a network graph, each PFE is a vertex, and a connection is an 'edge' between two PFEs (vertices) in the network graph. GX represents PFE vertex 'x', where x is fe-id. Kpq denotes the complete bigraph, where 'p' represents graph vertices on a GNF, and q represents the vertices on peer GNF. This will result in chassis daemon 1133 creating Unilists (see, e.g., FIG. 18). The Abstract Fabric (AF) interface is an overlay and uses the Kpq underlying bigraph.

FIG. 6 is a block diagram illustrating logical associations of PFEs with a virtual router, where chassis daemon 1133 makes the associations in forming an underlay network. The underlay network will be a collection of point-to-point connections. As an example, FIG. 6 illustrates a single router (vRTR) having an associated plurality of PFEs. A connection G(x,y), aka edge, represents a connection between Vertex 'X' and Vertex 'Y'. Chassis daemon 1133 initially creates a unicast path (or nexthop) between each end-point.

Figure 7:
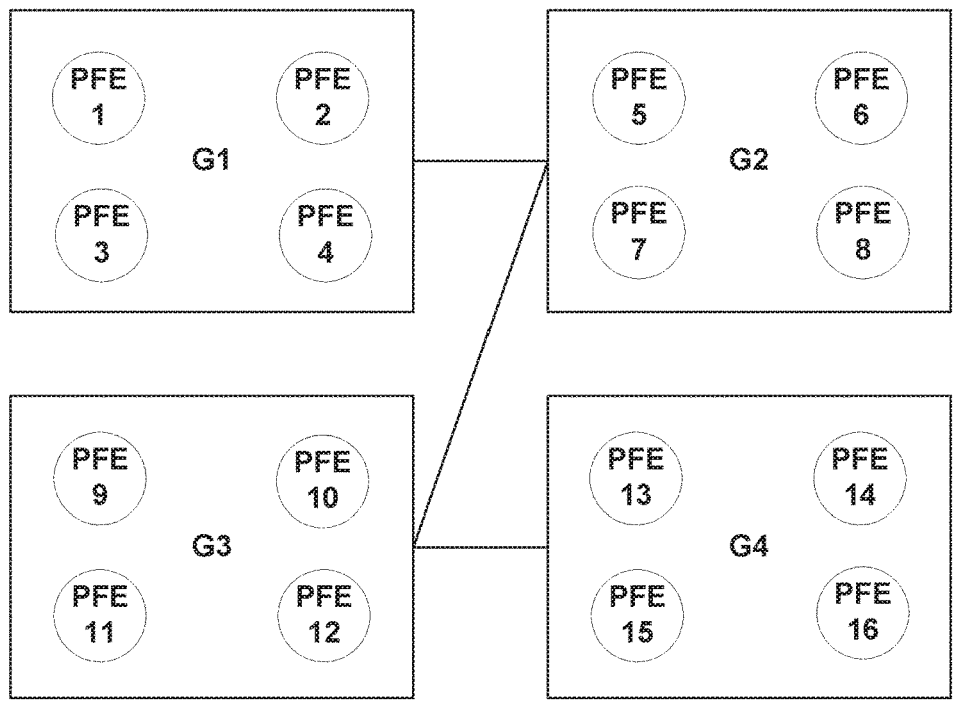
FIG. 7 is a block diagram illustrating a view of an overlay network having abstract fabric interfaces for connecting virtual nodes within a network device.

FIG. 7 is a block diagram illustrating a view of an overlay network having abstract fabric interfaces for connecting virtual nodes within a network device. The virtual nodes each have different sets of associated PFEs.

Figure 8:
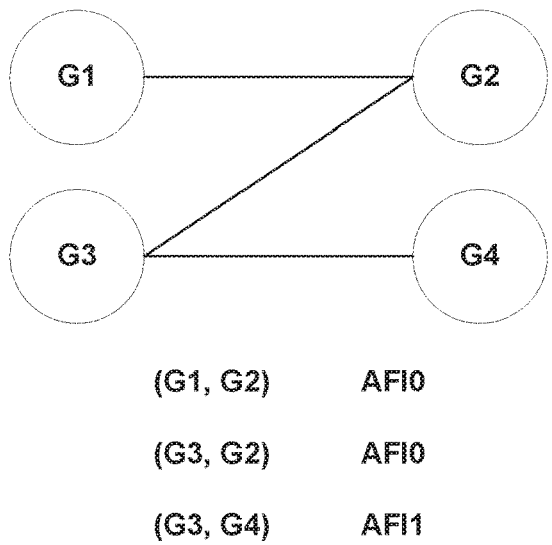
FIG. 8 is a block diagram illustrating another view of an overlay network having abstract fabric interfaces for connecting virtual nodes within a network device.

FIG. 8 is a block diagram illustrating another view of an overlay network having abstract fabric interfaces for connecting virtual nodes within a network device. Chassis daemon 1133 forms the overlay network when establishing logical connections between the GNFs. As shown in FIG. 8, an $AFI_I$, represents a connection between two GNFs. Each $AFI_I(G_X, G_Y)$ is identified by combining $G_X$ and $G_Y$ identifiers. Each vertex in $G_X$ will see all the Unilists for the destination $G_Y$.

In some examples, an Abstract Fabric Interface may be considered an Ethernet interface that represents a collective Fabric Interfaces (FI). The following is a representation of AFI interfaces.

afi0→abstract fabric interface instance '0'
afi0→abstract fabric interface instance '1'
afiN→abstract fabric interface instance 'N'

Chassis daemon 1133 forming the overlay network involves forming a complete bi-partite graph when two GNFs are connected each other, e.g., when the BSYS (Admin) informs the GNF connectivity. The Abstract Fabric (AF) interface is an overlay and uses the Kpq underlying bigraph. Overlay network will establish connections between the GNFs. An AF represents a connection between two GNFs (i.e. GX and GY). Each AF (GX, GY) is formed by combining its own GX and GY identifiers, where GX represents source GNF and GY represents the peer GNF. Forwarding will use the Unilist, created as a result of bigraph, and pick a destination PFE for that AF to forward the traffic using underlay network.

A user will see AF as just a regular WAN interface that connects two GNFs or a GNF to shared uplink, and does not have a footprint unless it is created via CLI on BSYS. Reachability between GNFs/SUs is programmed by chassis daemon 1133 without user awareness. User/Customer will see only the AF containing the peer GNF destination endpoints(PFEs), which may be useful for visualization and debugging.

With regard to forwarding over AF interfaces, chassis daemon 1133 will point routes to AF interface, as an overlay network. Forwarding plane 1178B PFE microkernel (e.g., by forwarding unit microprocessor 1162 of FIG. 3) will program packet processor 1168 to attach to the Unilist built using the underlying network and engage to the forwarding chain. Forwarding unit microprocessor 1162 will also intelligently load-share the outgoing traffic of the peer GNF destination PFEs list. In this manner, the techniques of this disclosure provide a simpler user-facing configuration for AFI on demand, as the underlay network absorbs the intricacies. AFI allows for efficiently connecting pairs of virtualized routing nodes in node virtualization.

With this infrastructure, a user/customer can dynamically build their own topology, in the sense that the customer can request GNFs that should be connected via an AFI. When a router has to communicate to another router on a node virtualization chassis, configuring an AF interface is all that is required. In some examples, an AF may be used to connect three routers (e.g., GNF-1, GNF-2 and SU). For example, as shown in FIG. 8, G1, G2, and G3 are connected by 'AFI0'.

Figure 9:
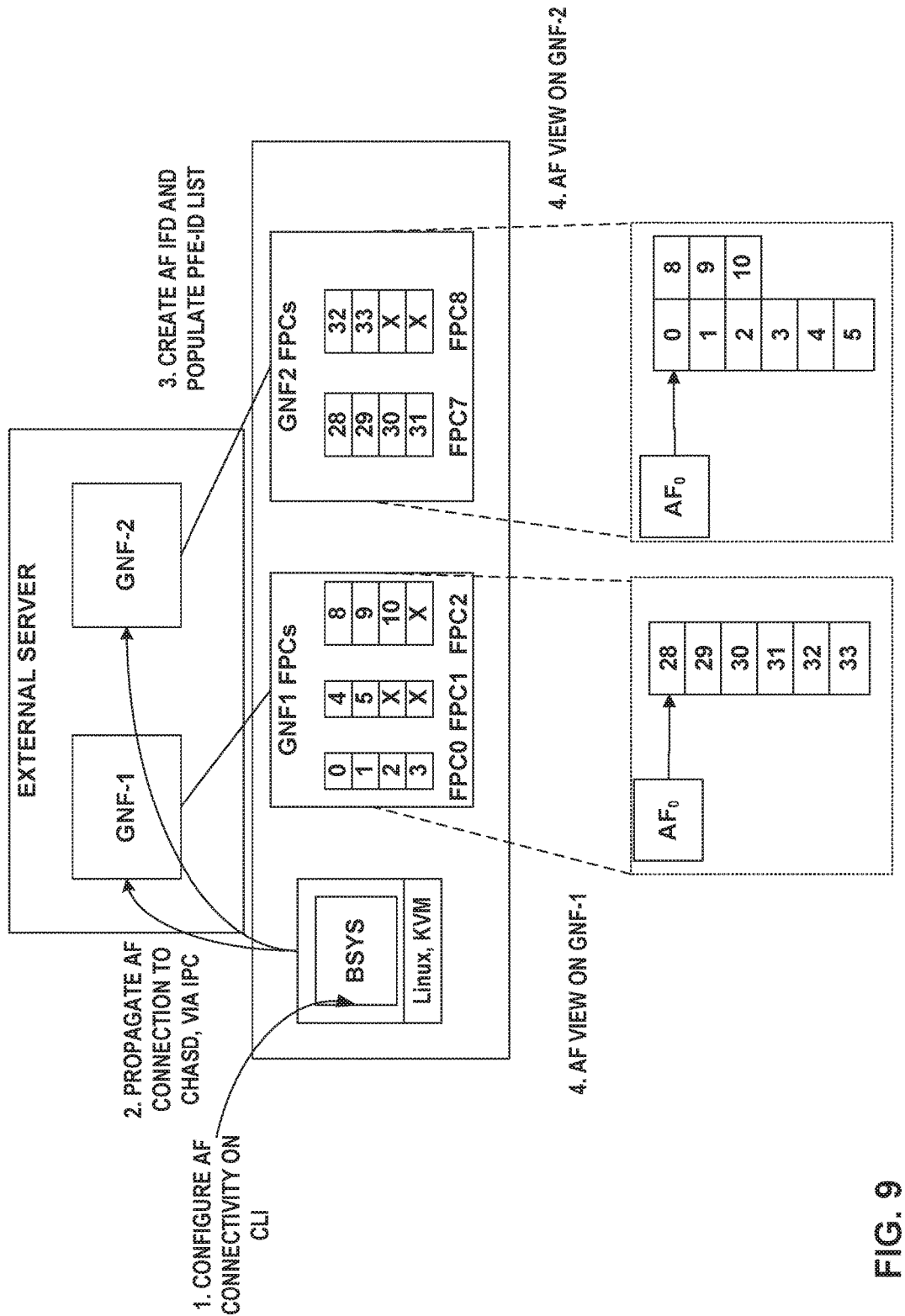
FIG. 9 is a block diagram illustrating example component interaction in creating abstract fabric interfaces between virtual nodes, in accordance with techniques described in this disclosure.

FIG. 9 is a block diagram illustrating example component interaction in creating abstract fabric interfaces between virtual nodes in accordance with techniques described in this disclosure. In the AFI and FI view on a GNF, the AFI to FI/PFE reachability is only stored by the forwarding component (e.g., PFE), and is not visible at any of the above layers. This is what is known as an overlay and underlay network. The connectivity between overlay and underlay is via afi-id and is generated internally within the system, e.g., by the chassis daemon.

Figure 10:
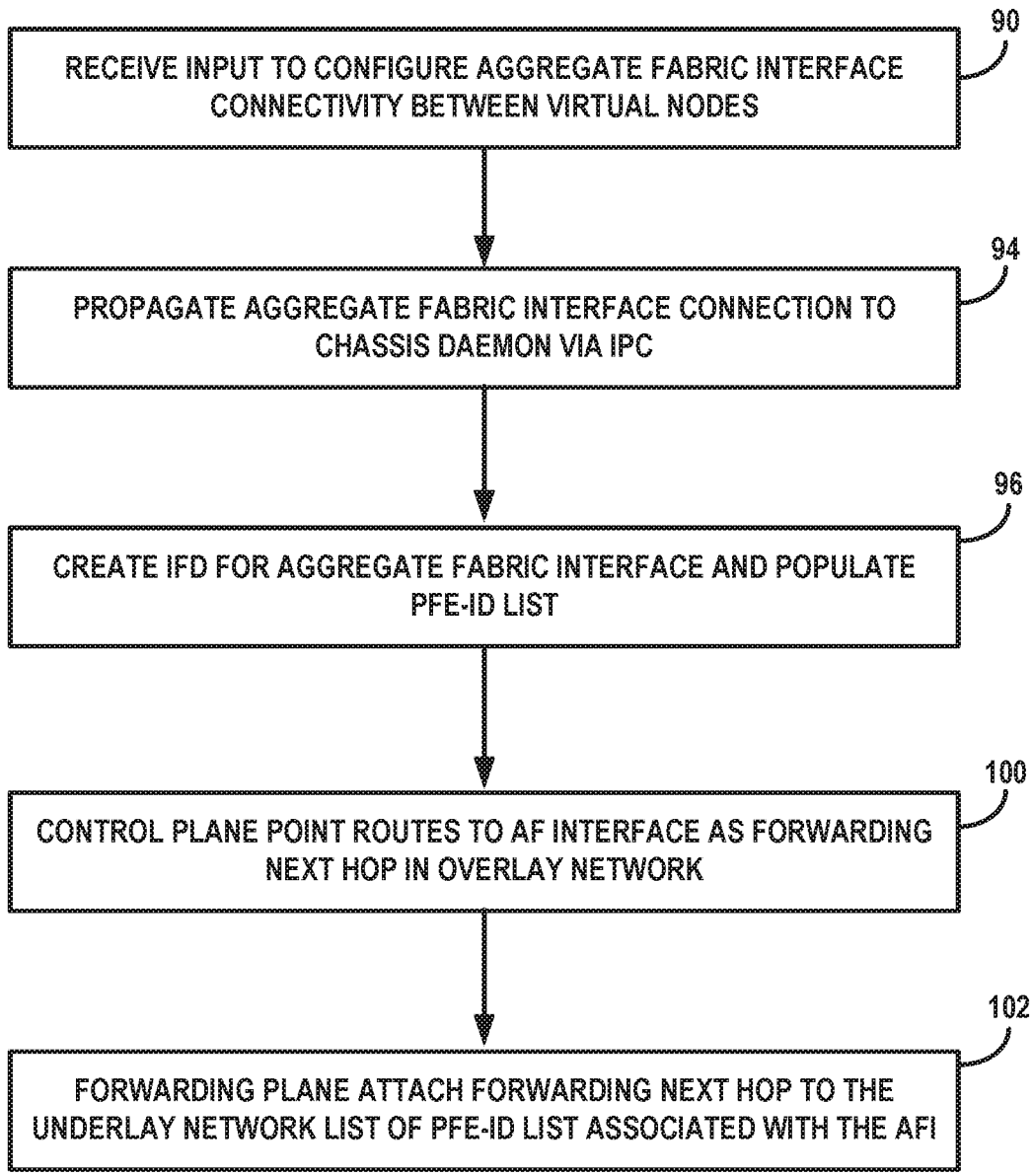
FIG. 10 is a flowchart illustrating an example mode of operation, in accordance with techniques described in this disclosure.

FIG. 10 is a flowchart illustrating an example mode of operation in accordance with techniques described in this disclosure. FIG. 10 is described for purposes of example with respect to devices of FIGS. 1A-2. In the example of FIG. 10, a network device (e.g., single-chassis router 1012 of FIGS. 1A-2). Single-chassis router 1012 receives input to configure abstract fabric interface connectivity between virtual nodes, such as via CU 1132 (90). Single-chassis router 1012 propagates the abstract fabric interface connection from CLI 1132 to the chassis daemon via inter-process communication (IPC) (94). For example, the base system virtual machine executing in the routing engine may send an indication of the AFI connection to the chassis daemon on a server component of the single-chassis router.

The chassis daemon of single-chassis router 1012 creates an IFD for abstract fabric interface, and populates the PFE-ID list for the IFD (96). The control plane of single-chassis router 1012 points routes to the AF interface in the overlay network (100). For example, a routing process (e.g., routing protocol daemon 1134 of FIG. 3) instructs kernel 1143 to create a forwarding next hop in a route table and programs the abstract fabric interface as the outgoing interface of the forwarding next hop, e.g., programs the ID of the AFI as the outgoing interface. Kernel 1143 may program the route table to forwarding unit 1120 via another IPC tunnel messaging between forwarding unit interface 1116 and programming interface 1164. The forwarding plane of single-chassis router 1012 attaches the forwarding next hop to the underlay network unilist associated with the AFI (102). For example, forwarding unit microprocessor 1162 of forwarding unit 1120A creates a PFE mapping table in forwarding plane 1178B based on information received via programming interface 1164 from chassis daemon 1133 that maps AFIs to lists of PFE-IDs. PFE mapping table provides a reverse-logic mapping to get the AFI based on the PFE-ID carried in a header of an incoming packet.

For example, network device 1013 receives configuration information creating an abstract fabric interface to connect a first virtual node (e.g., a first GNF) of the network device to a second virtual node (e.g., a second GNF) of the network device. In response to receiving the configuration information, the network device associates the abstract fabric interface with a list of identifiers of each of a plurality of forwarding components of the network device assigned to the second virtual node, and, in a control plane of the network device, creates a route at the first virtual node, the route having the abstract fabric interface as a forwarding next hop. In a forwarding plane of the first virtual node, the network device programs the forwarding plane to attach the list of identifiers to the forwarding next hop. In response to receiving network traffic at the first virtual node that is destined for the second virtual node, the network device forwards, based on the forwarding next hop, the network traffic to the second virtual node via the abstract fabric interface. In this manner, a management component such as a chassis daemon executing on the single-chassis network device configures a virtual node with an abstract fabric interface having, as a destination address, identifiers of forwarding components (e.g., PFE-IDs) assigned to the virtual node on the other end of the abstract fabric interface. The management component of the single-chassis network device pre-creates an underlay network by using the fabric links at the forwarding component. When the management component creates and connects an AFI on the virtual nodes, the management component forms an overlay network and attaches the overlay network to the underlay network, e.g., by programming the forwarding plane packet processor, to connect the virtual nodes.

In this way, connectivity between GNFs can be dynamically established on-demand, avoiding the need to use up fabric bandwidth with pre-established connections before they are needed. The techniques of this disclosure allow for connecting two virtual routers when the underlying forwarding plane and fabric interconnectivity between the virtual routers does not have a concept of P2P connectivity. However, users of the network device, external devices, and routing protocols will not view the abstract fabric interface as an overlay interface, but as a regular Ethernet interface. For example, a first GNF network node may advertise to other network devices, e.g., via a routing protocol, the abstract fabric interface as an Ethernet interface between itself and a second GNF network node.

Figure 11:
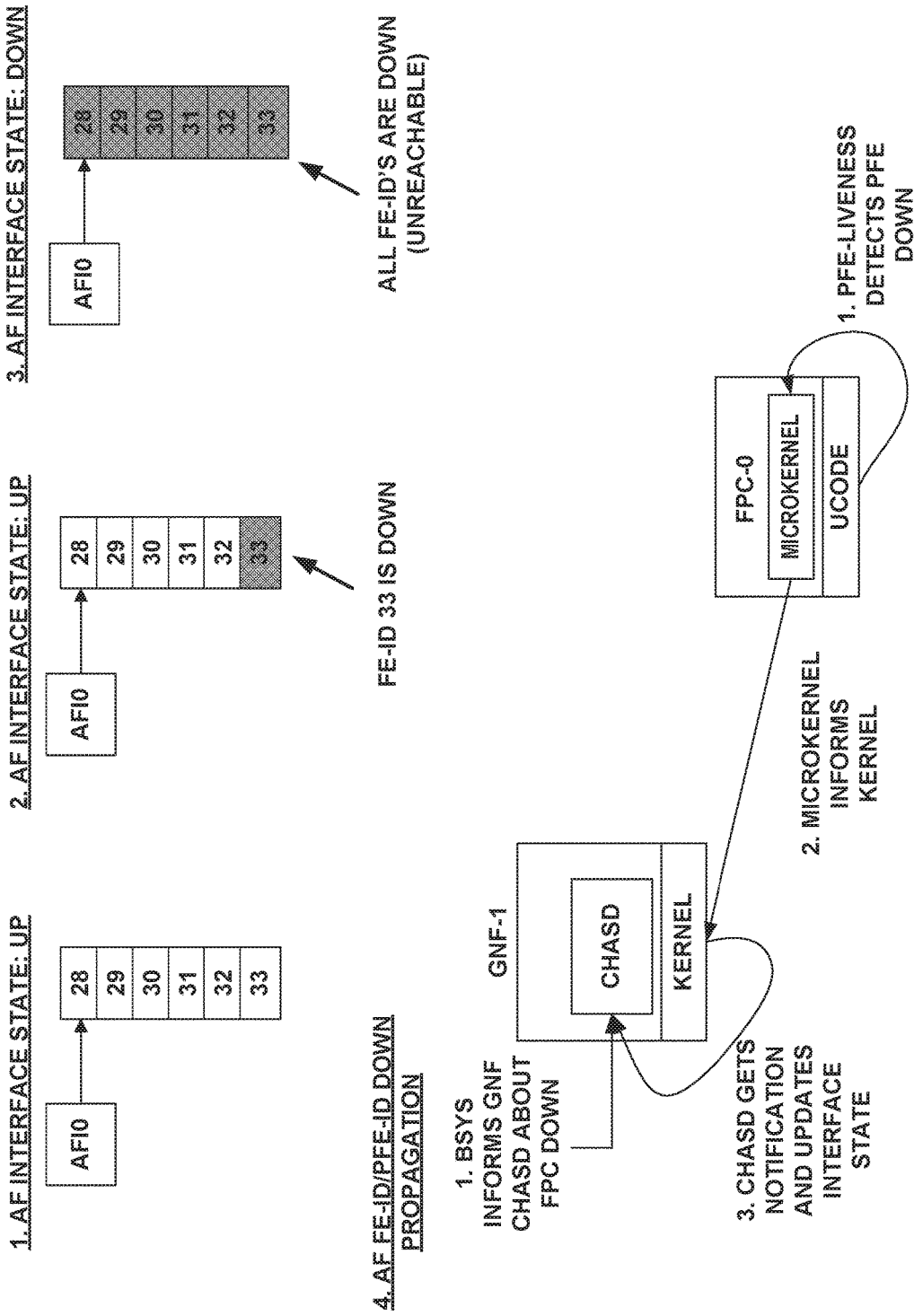
FIG. 11 is a block diagram illustrating abstract fabric interface properties and states, in accordance with techniques described in this disclosure.

FIG. 11 is a block diagram illustrating abstract fabric interface properties and states in accordance with techniques described in this disclosure. As shown in FIG. 11: 1. AF interface state is up; 2. AF interface state is up, but FE-ID 33 is down; 3. AF interface state is down, and all FE-IDs are down (unreachable); and 4. AF FE-ID/PFE-ID down propagation occurs: 1. PFE-Liveness detects PFE down, and BSYS informs GNF chassis daemon 1133 (management interface) about FPC down; 2. Microkernel (e.g., forwarding unit microprocessor 1162) informs kernel 1143 of FPC down; and 3. Chassis daemon 1133 receives notification and updates stored interface state.

Figure 12:
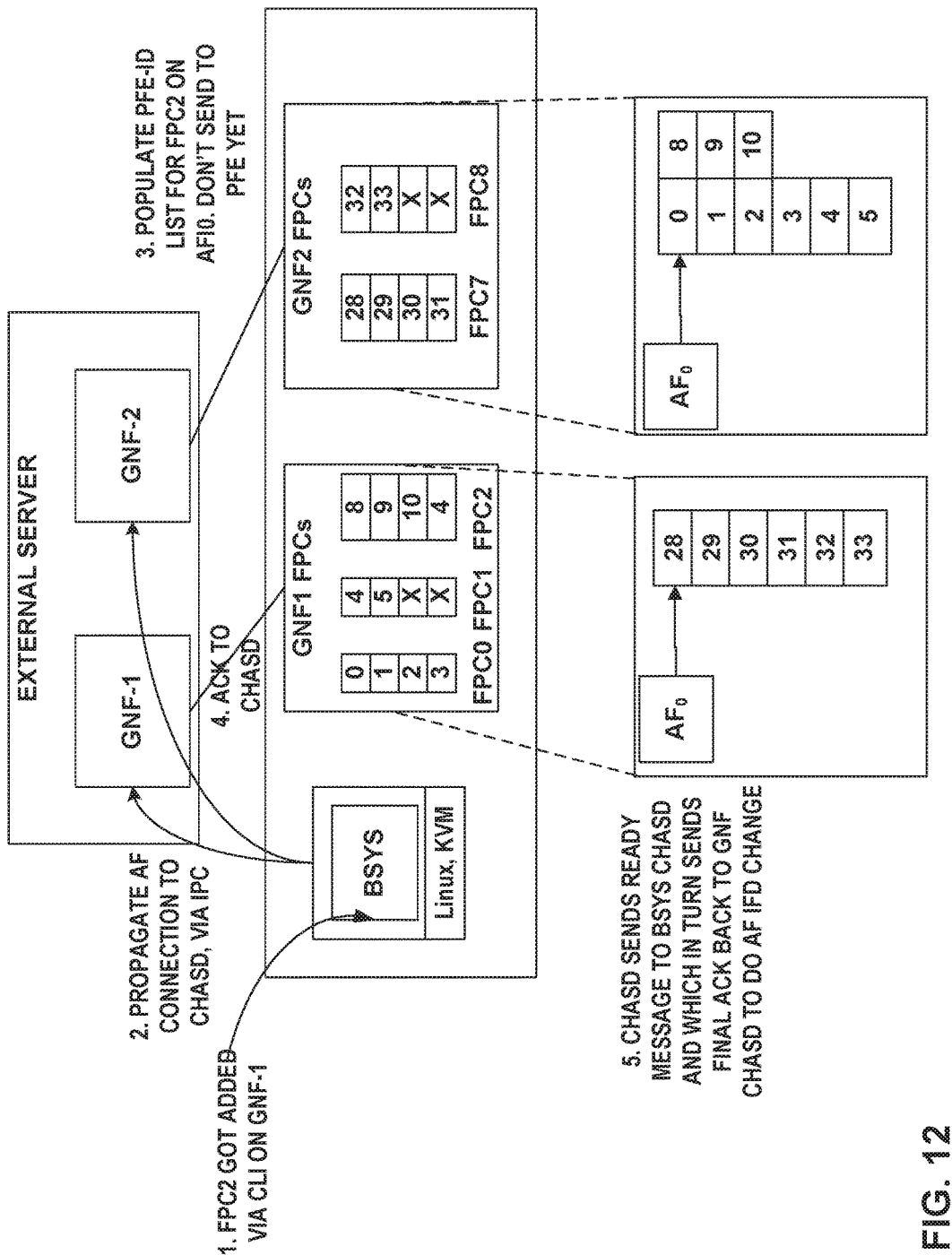
FIG. 12 is a block diagram illustrating the addition of a new flexible programmable integrated circuit (PIC) concentrator (FPC), in accordance with techniques described in this disclosure.

FIG. 12 is a block diagram illustrating addition of a new FPC to a GNF in accordance with techniques described in this disclosure. Similar techniques may apply to FPC removal from a GNF. FPC addition/removal can occur in two ways: Via CLI config from BSYS, FPC going down, causing PFEs of that FPC going down, or single PFE of FPC going down. For the first case, information will be propagated to GNFs/SU via BSYS as a CLI config. The event triggering this can either be a line card addition or existing line card removal, and those FPCs should be informed to PFE to add/remove from forwarding. For the latter case, the affected PFE of AFI/FI may be learnt via a PFE liveness mechanism and the events will be propagated to the control plane/routing engine. PFE-liveness may be a mechanism implemented in hardware to detect PFE liveness.

Figure 13:
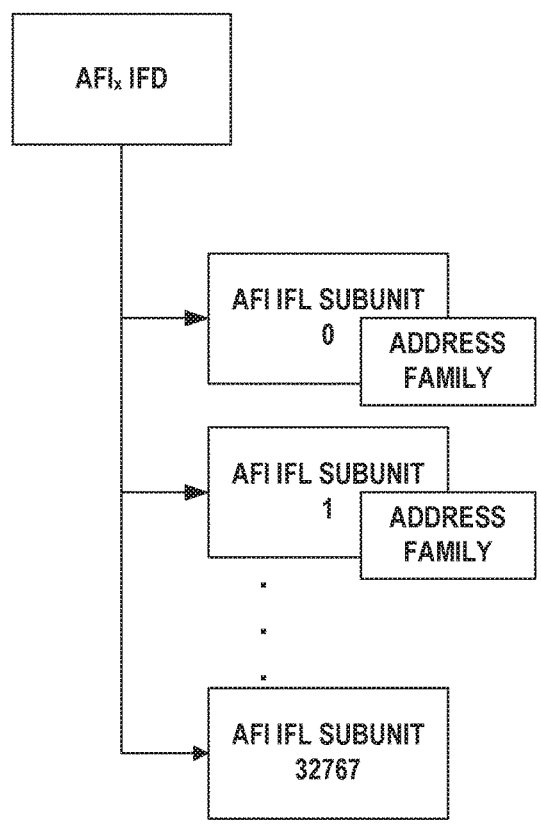
FIG. 13 is a block diagram illustrating logical relationships between an abstract fabric interface (AFI) physical interface ("IFD") and its logical interfaces (IFLs) and address families.

FIG. 13 is a block diagram illustrating logical relationships between an AFI IFD and its IFLs and address families. AFI Nexthops: For each Unicast NH created under AFI ifl, the pfe-id will remain as '255', and there will not be any underlying ifl's to reach the remote GNF. Forwarding path will use the afi-id for that AFI to forward the traffic to the remote GNF. FI logical interfaces: FI ifl's are created for p2p connections across PFEs. They may be used as Ethernet ifl for optimal fabric path functionality.

Figure 14:
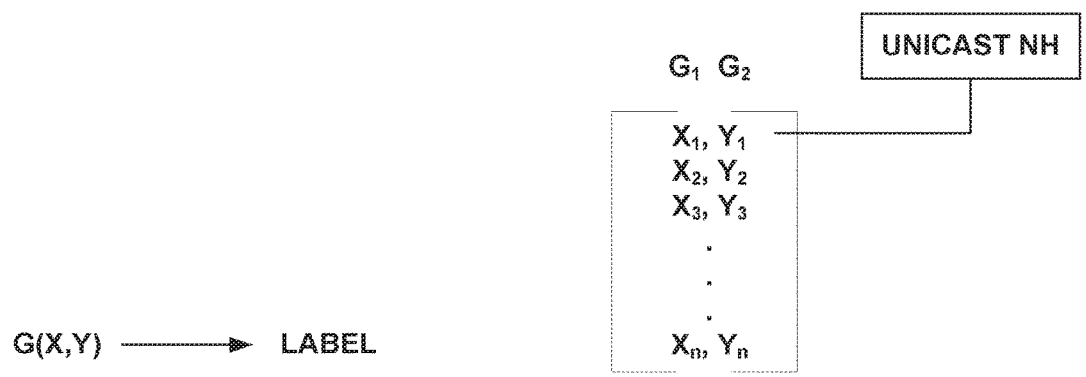
FIG. 14 is a block diagram illustrating a mapping between virtual nodes to unicast next hop list.

FIG. 14 is a block diagram illustrating an example mapping between virtual nodes to unicast next hop list. FIG. 14 indicates the list of unicast next hops that are used to form a destination group for a peer GNF.

FIG. 15 is a block diagram illustrating the P2P IFL and next hop (NH) relationship. Specifically, FIG. 15 illustrates the FI(IFD-IFL-NH) relationship for fi-1/0/0, according to some example implementations. In some examples, only one unit will be created for each peer PFE. Since these IFLs are pre-created by chassis daemon 1133 as part of underlay network creation, in some example implementations there may be 316 IFLs on a system. In some example implementations, these IFLs are not CLI configurable. In some example implementations, the system supports only inet and inet6 family. The address resolution protocol physical network address will be resolved for the fi IFL interface routes and form ARP NHs, as shown in FIG. 15.

Figure 16A:
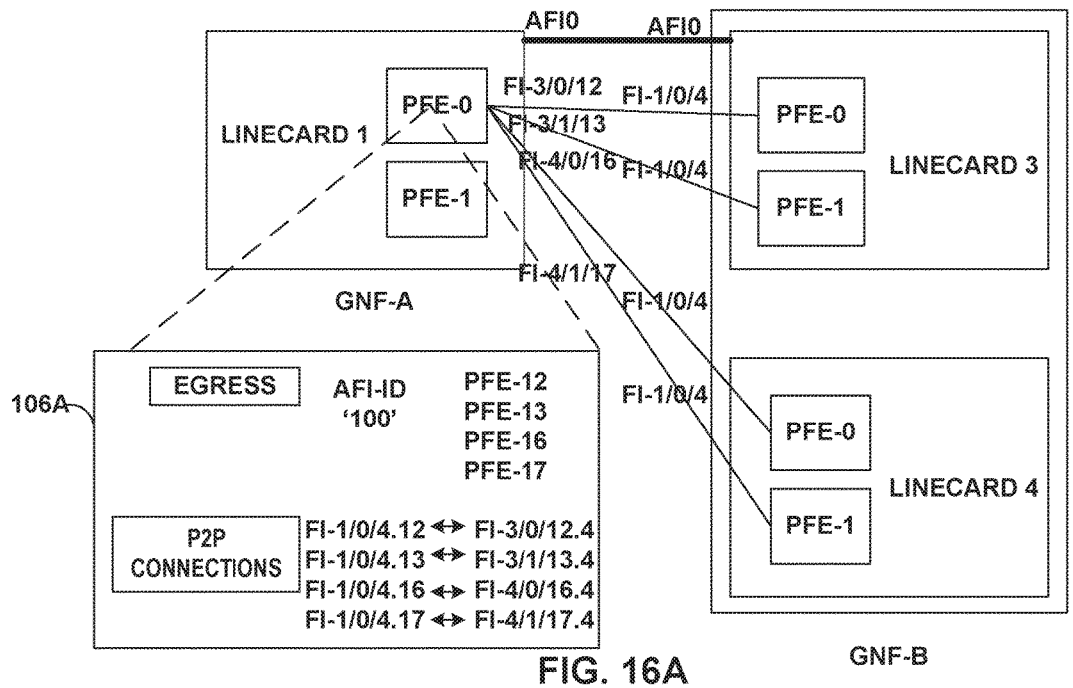
FIGS. 16A-16D are block diagrams illustrating AFI IFD and p2p fi connectivity.

FIGS. 16A-16D are block diagrams illustrating example AFI IFD and P2P fabric interface (fi) connectivity. FIG. 16A is a block diagram illustrating AFI IFD and P2P fi connectivity (on FPC1, PFE 0), FIG. 16A shows the AFI and FI view after an AFI connection is formed between the GNFs. In this illustration GNF-A and GNF-B are connected using 'afi0'IFDs. The egress portion indicates the egress flow of traffic from GNF-A PFE'0' perspective. The P2P ifl connections are formed via interface configuration.

P2P FI connections: fi-3/0/12.4← →fi-1/0/4.12. From this link connection, a point to point connection is formed between FPC 1, PFE 0 and FPC 3, PFE 0.

Figure 16B:
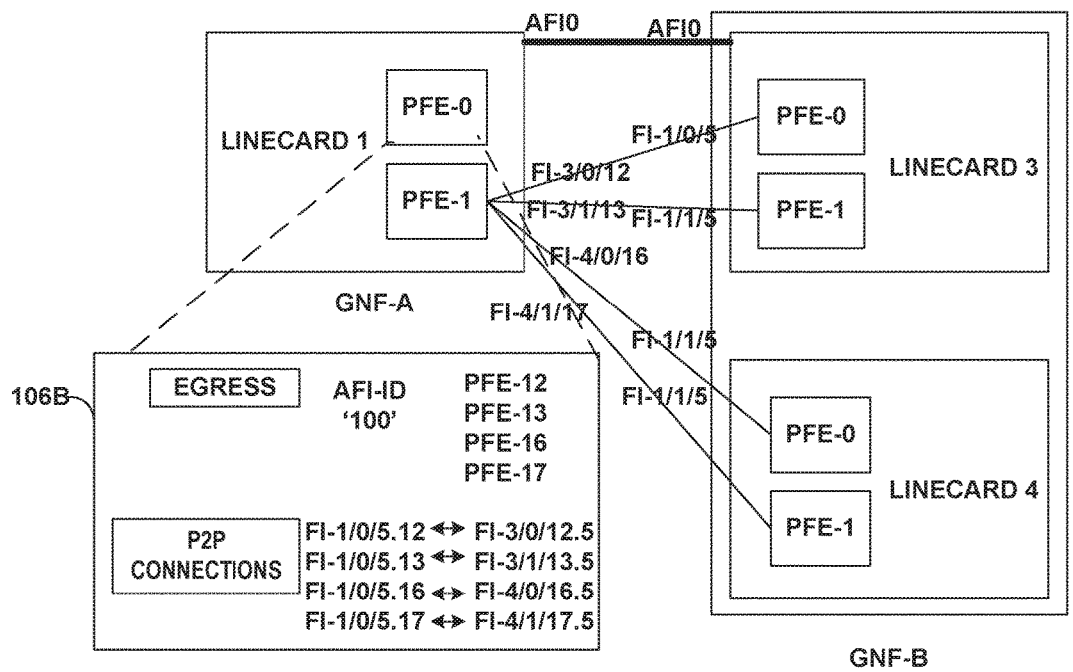
Figure 16C:
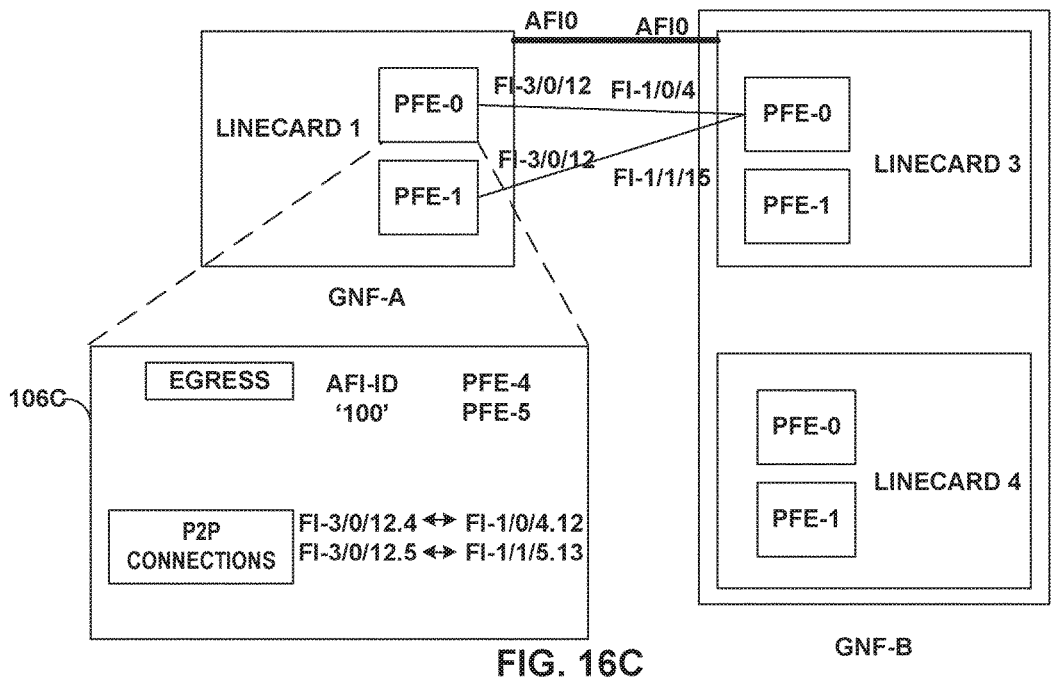
Figure 16D:
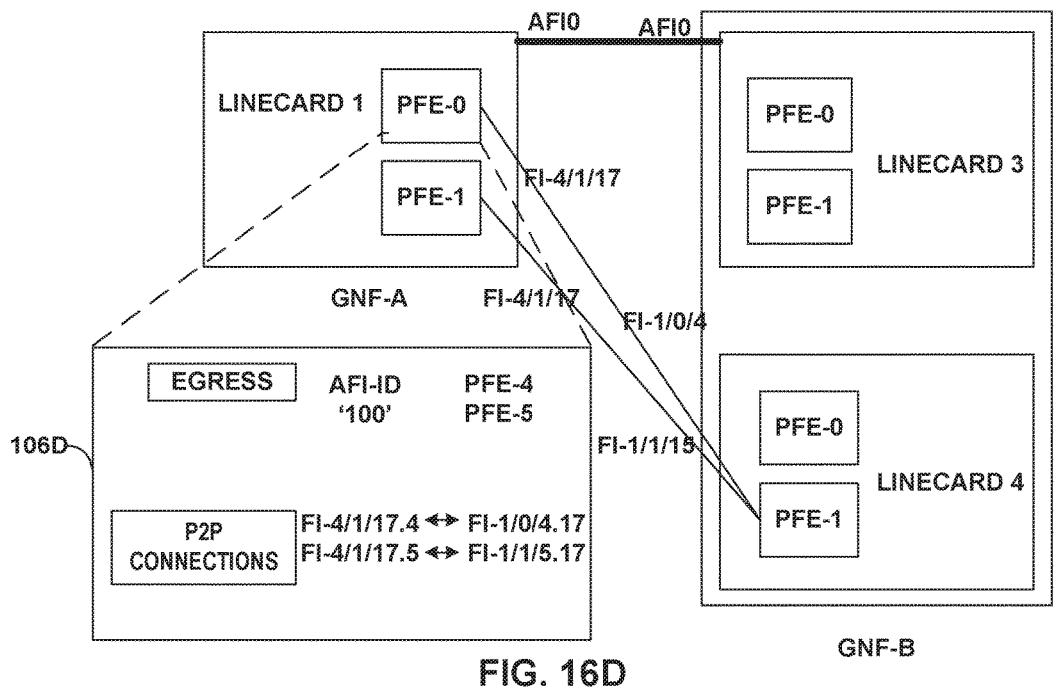

FIG. 16B is a block diagram illustrating AFI IFD and P2P fi connectivity (on FPC 1, PFE 1). FIG. 16B shows the AFI and FI connections from FPC 1, PFE 1 perspective. FIG. 16C is a block diagram illustrating AFI IFD and P2P fi connectivity (on FPC 3, PFE 0). FIG. 16C shows the AFI and FI connections from FPC 3, PFE 0 perspective. FIG. 16D is a block diagram illustrating AFI IFD and P2P fi connectivity (on FPC 4, PFE 1) for forwarding to GNF/SU. FIG. 16D shows the AFI and FI connections from FPC 4, PFE 1 perspective. Each of FIGS. 16A-16D illustrates example respective forwarding information 106A-106D ("forwarding information 106") programmed to the forwarding plane of PFE-0 (e.g., forwarding plane 1178B of FIG. 3). The forwarding information 106 shows the relationship between the overlay network AF-ID and the underlay network composed of P2P connections between fabric interfaces. In the example of FIGS. 16A-16D, the underlying fabric interfaces of the PFEs are assigned interface IDs.

Figure 17:
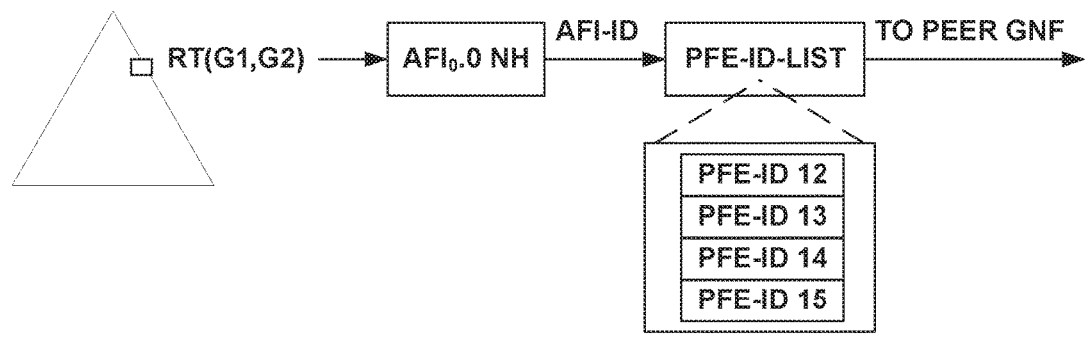
FIG. 17 is a block diagram illustrating a traffic forwarding mechanism for sending traffic to a peer GNF, using the AFI ID (afi-id).

FIG. 17 is a block diagram illustrating a traffic forwarding mechanism for sending traffic to a peer GNF, using the AFI ID (afi-id). FIG. 17 may represent a packet processing path that a packet follows in forwarding plane 1178B of FIG. 3, for example. AFI-id is a unique identifier obtained by chassis daemon 1133 during AFI IFD creation. PFE-id-list represents a remote PFE list (i.e., a list of PFE-IDs of a remote GNF. The forwarding plane is programmed by chassis daemon 1133 with a route for forwarding traffic between GNF G1 and GNF G2. The route points to the AFI next hop specifying an AFI-ID. The AFI-ID points to a PFE-ID-list of all the PFE-IDs of the peer GNF that may be used for forwarding traffic to the peer GNF G2. The forwarding plane selects a PFE-ID from the list (e.g., using a load balancing algorithm), and forwards the packet across a fabric link to the selected PFE-ID.

Figure 18:
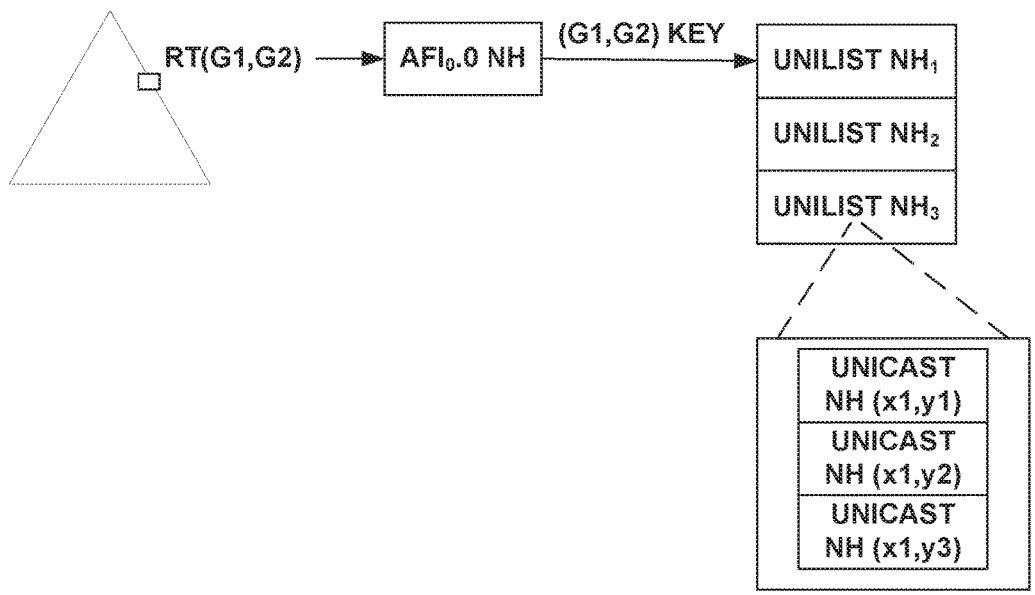
FIG. 18 is a block diagram illustrating another traffic forwarding mechanism for sending traffic to a peer GNF.

FIG. 18 is a block diagram illustrating another traffic forwarding mechanism for sending traffic to a peer GNF. In the example of FIG. 18, $x_x \rightarrow$ 'x' represents local PFE vertex of G1; $y_y \rightarrow$ 'x' represents local PFE vertex of G2. In the example of FIG. 18, route(G1, G2) points to AFI00 nexthop; the (G1, G2) key points to the unilist next hops, and one of the unilist is chosen based on local bias.

Figure 19:
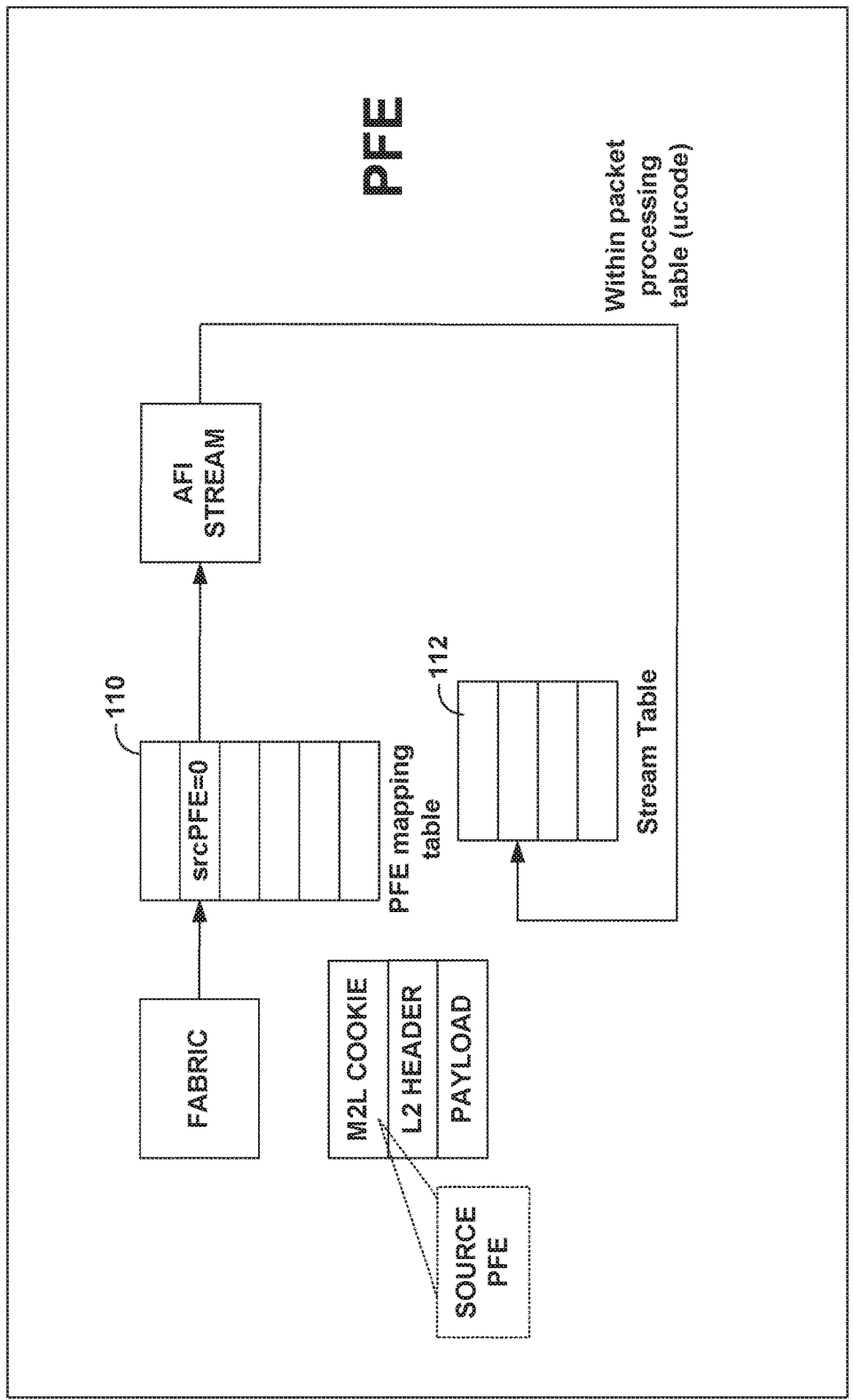
FIG. 19 is a block diagram illustrating fabric side processing performed by a PFE on a GNF.

FIG. 19 is a block diagram illustrating fabric side processing performed by a PFE on a GNF, e.g., within packet processor 1168 of FIG. 3. The M2L cookie of the incoming packet contains the source PFE ID, which the PFE forwarding plane receiving the incoming packet looks up in the PFE mapping table 110 to identify the AFI stream. PFE mapping table 110 may be programmed in packet processor 1168, and key engine 1170 may do a lookup in PFE mapping table 110 of the source PFE ID as specified in the 1\42L cookie of the incoming packet. The lookup provides an indication of the AFI stream associated with the source PFE ID, which may be looked up in stream table 112. The mapping in PFE mapping table 110 that maps the source PFE ID to the AFI stream was programmed by chassis module 1133 during creating of the underlay and overlay networks. For example, prior to forwarding the network traffic, the ingress PFE inserts in a packet header of a packet of the network traffic (e.g., in the M2L cookie) an identifier of a source packet processor of the first virtual node (e.g., source PFE ID).

When the packet is received at the packet processor of the second virtual node, that packet processor determines the abstract fabric interface on which the packet is received at the second virtual node by looking up the identifier of the source packet processor in the PFE mapping table 110 that maps the identifier to the abstract fabric interface. The packet processor of the second virtual node (GNF) processes the received packet based on the determined abstract fabric interface. In this manner, the forwarding plane of a PFE can determine what AFI the packet is associated with so that it can be processed appropriately.

Figure 20:
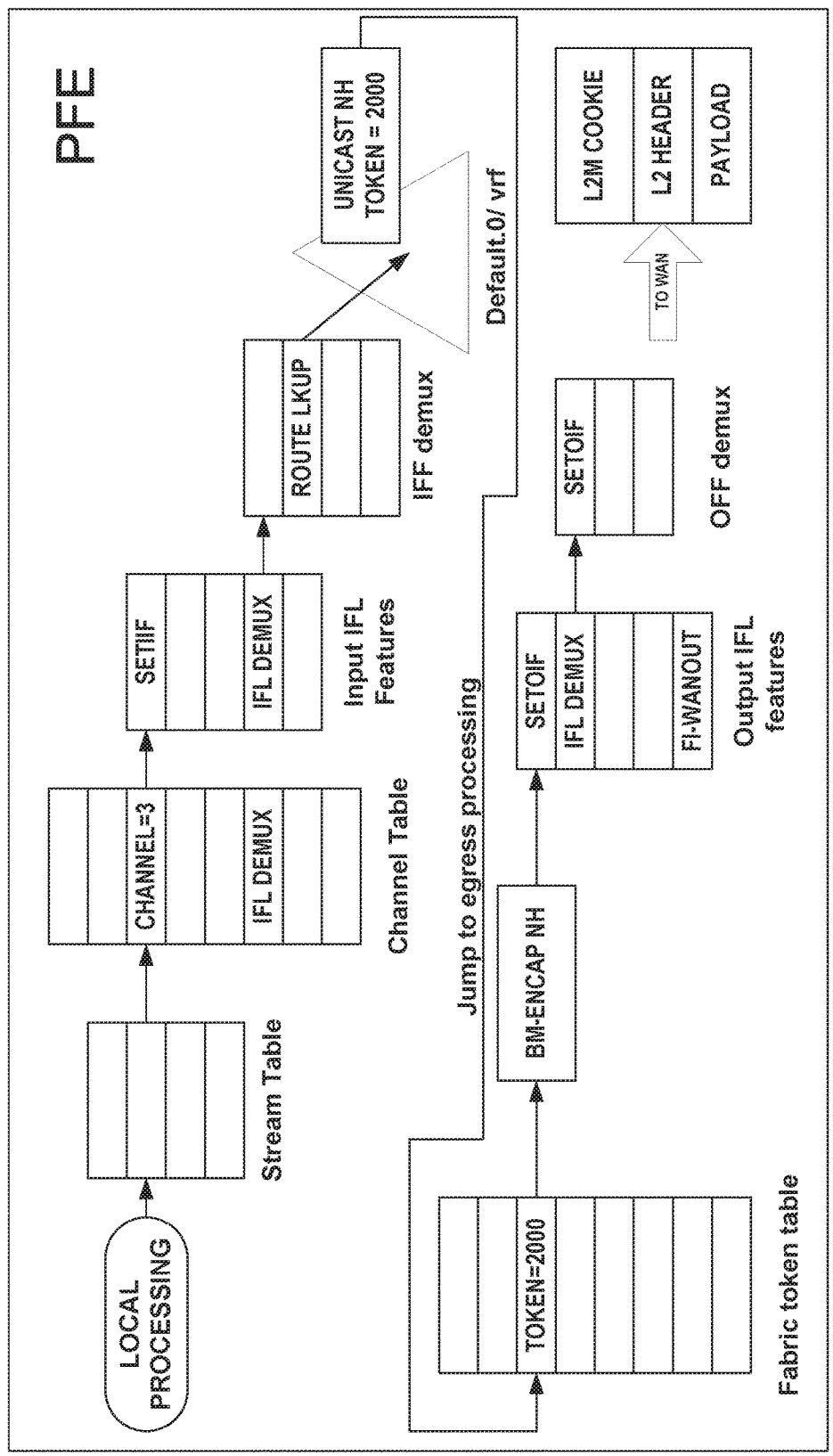
FIG. 20 is a block diagram illustrating wide area network (WAN) side processing on a GNF.

FIG. 20 is a block diagram illustrating wide area network (WAN) side processing performed by a PFE on a GNF, e.g., within packet processor 1168 of FIG. 3. Ingress processing within the PFE is as follows. After local processing, a packet is looked up (e.g., by key engine 1170) in a stream table and channel table, which points to input IFL features. A route lookup follows which provides a unicast nexthop and fabric token. Egress processing within the PFE is as follows. The fabric token is looked up in a fabric token table, and then encapsulated. Output IFL features and OFF demux follows. The packet is then output on the WAN interface bearing an L2 header and L2M cookie. FIGS. 19 and 20 correspond to how traffic is forwarded by, for example, forwarding unit 1120A of FIG. 3, including forwarding path 1172.

Figure 21:
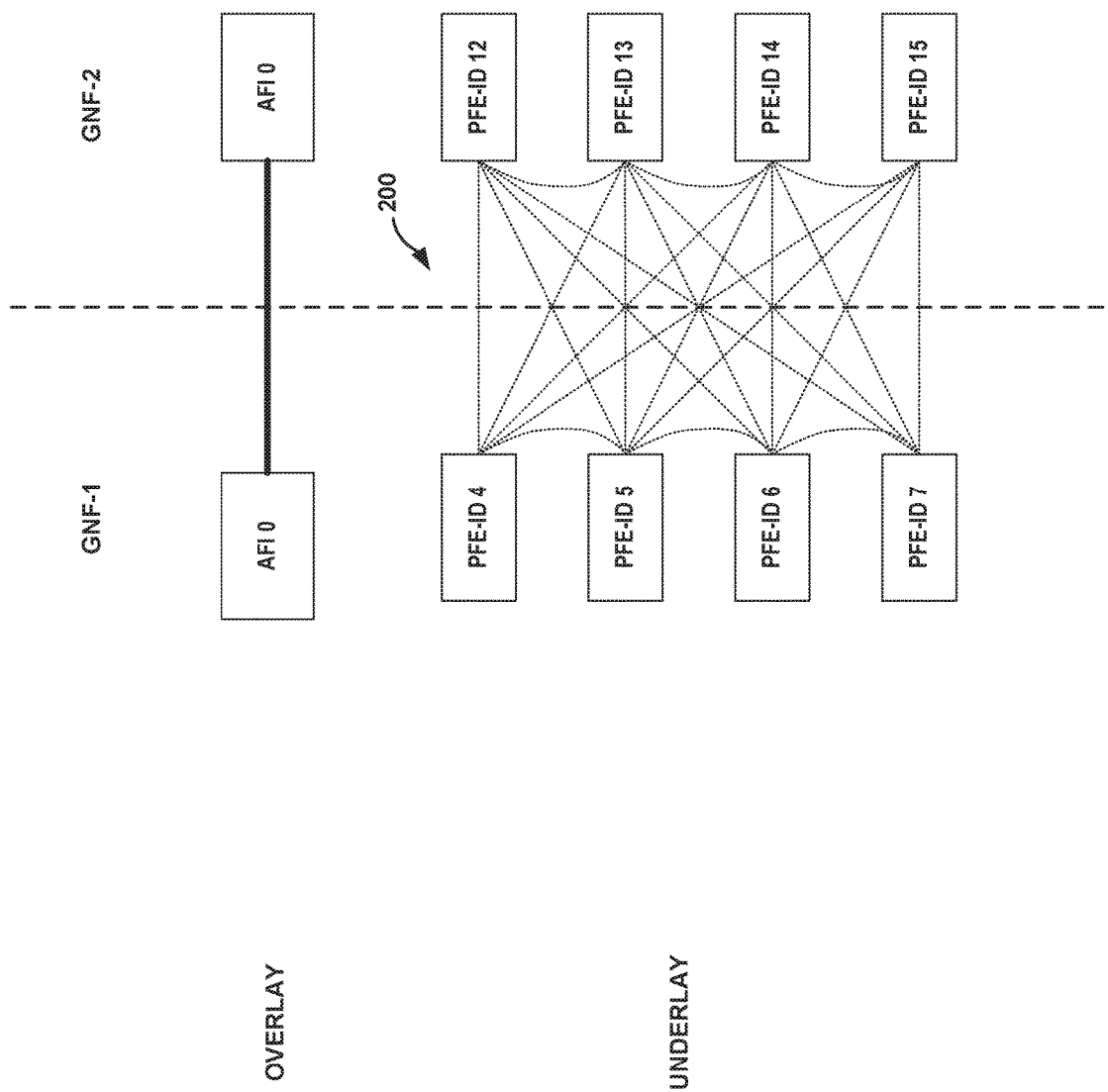
FIG. 21 is a block diagram illustrating a logical architecture of an abstract fabric interface of an overlay network as related to an underlay network composed of packet processors interconnected by fabric links.

FIG. 21 is a block diagram illustrating a logical architecture of an abstract fabric interface of an overlay network as related to an underlay network composed of packet processors (e.g., PFEs) interconnected by fabric links. An abstract fabric interface has no associated physical interface. Rather, AFIs are defined in terms of PFE-ID. Each abstract fabric interface has an associated ID (e.g., AFI 0). The child IDs of the AFI 0 are PFE-IDs. As shown in FIG. 21, PFEs assigned to GNF-1 having respective PFE-IDs 4, 5, 6, and 7 are connected by fabric links 200 to PFEs assigned to GNF-2 having respective PFE-IDs 12, 13, 14, and 15. When the two GNFs are connected by an AFI, i.e., when the AFI 0 is formed, each GNF will send its local interfaces to the remote GNF. For example, GNF-1 will send its list of local PFE-IDs 4, 5, 6, and 7 to GNF-2, and GNF-2 will send its local list of PFE-IDs 12, 13, 14, and 15 to GNF-1. When network traffic has to go from GNF-1 on PFE-ID 4, the forwarding plane of PFE-ID 4 is programmed such that the route from GNF-1 to GNF-2 points to an AFI next hop that points to the list of remote PFE-IDs associated with AFI-0 (see, e.g., FIG. 17). PFE-ID 4 selects one of the PFE-IDs from the list to which to forward the traffic.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
receiving, by a network device, configuration information creating an abstract fabric interface to connect a first virtual node of the network device to a second virtual node of the network device, wherein the network device comprises a plurality of packet processors including a first subset of packet processors used by the first virtual node and a second subset of packet processors used by the second virtual node, the second subset being distinct from the first subset;
in response to receiving the configuration information, associating, by the network device, the abstract fabric interface with a list of identifiers of each of the second subset of packet processors of the network device used by the second virtual node;
in a control plane of the network device, creating a route at the first virtual node, the route having the abstract fabric interface as a forwarding next hop;
in a forwarding plane of the first virtual node, programming the forwarding plane to attach the list of identifiers to the forwarding next hop;
receiving network traffic at the first virtual node; and
based on the forwarding next hop, forwarding the network traffic from the first virtual node to the second virtual node via the abstract fabric interface, wherein forwarding the network traffic to the second virtual node via the abstract fabric interface comprises forwarding the network traffic via one of a plurality of fabric links coupling one of the first subset of packet processors to one of the second subset of packet processors.

2. The method of claim 1, wherein forwarding the network traffic to the second virtual node via the abstract fabric interface comprises selecting one of the identifiers from the list of identifiers, and forwarding the network traffic to one of the second subset of packet processors used by the second virtual node associated with the selected one of the identifiers.

3. The method of claim 1, wherein creating a route comprises creating, by a routing process executing in the control plane of the network device, the forwarding next hop in a route table and programming the abstract fabric interface as the outgoing interface of the forwarding next hop.

4. The method of claim 3, further comprising:
in response to receiving the configuration information, creating, by the network device, an interface identifier for the abstract fabric interface,
wherein programming the abstract fabric interface as the outgoing interface comprises programming the interface identifier as the outgoing interface of the forwarding next hop.

5. The method of claim 1, further comprising:
prior to forwarding the network traffic, inserting in a packet header of a packet of the network traffic an identifier of a source packet processor of the first virtual node;
receiving the packet by a receiving packet processor of the second subset of packet processors used by the second virtual node;
by the receiving packet processor, determining the abstract fabric interface on which the packet is received at the second virtual node by looking up the identifier of the source packet processor in a mapping table that maps the identifier to the abstract fabric interface; and
processing the received packet based on the determined abstract fabric interface.

6. The method of claim 1, wherein the network device comprises a single-chassis network device.

7. The method of claim 1, further comprising:
advertising, by the first virtual node of the network device and to other network devices, the abstract fabric interface as an Ethernet interface between itself and the second virtual node of the network device.

8. The method of claim 1, wherein forwarding the network traffic comprises load balancing the network traffic across the plurality of fabric links coupling a packet processor used by the first virtual node to one of the subset of packet processors used by the second virtual node.

9. A single-chassis network device comprising:
a plurality of packet processors;
a first virtual node configured to forward packets using a first subset of the plurality of packet processors;
a second virtual node configured to forward packets using a second subset of the plurality of packet processors, the second subset being distinct from the first subset; and
a management component configured to:
receive an indication of configuration information creating an abstract fabric interface to connect a first virtual node of the network device to a second virtual node of the network device;
in response to receiving the indication, associate the abstract fabric interface with a list of identifiers of each of a plurality of packet processors of the network device assigned to the second virtual node;
create a route at the first virtual node, the route having the abstract fabric interface as a forwarding next hop; and
program a forwarding plane of the first virtual node to attach the list of identifiers to the forwarding next hop,
wherein the first virtual node is configured to receive network traffic and, based on the forwarding next hop, forward the network traffic to the second virtual node via the abstract fabric interface, wherein to forward the network traffic to the second virtual node via the abstract fabric interface, the first virtual node is configured to forward the network traffic via one of a plurality of fabric links coupling one of the first subset of packet processors to one of the second subset of packet processors.

10. The network device of claim 9, wherein the first virtual node is configured to forward the network traffic to the second virtual node via the abstract fabric interface by selecting one of the identifiers from the list of identifiers, and forwarding the network traffic to one of the second subset of packet processors used by the second virtual node associated with the selected one of the identifiers.

11. The network device of claim 9, wherein the management component comprises a routing process executing in the control plane of the network device, wherein the routing process is configured to create the forwarding next hop in a route table and program the abstract fabric interface as the outgoing interface of the forwarding next hop.

12. The network device of claim 11, wherein the management component is configured to, in response to receiving the configuration information, create an interface identifier for the abstract fabric interface,
 wherein the management component is configured to program the abstract fabric interface as the outgoing interface by programming the interface identifier as the outgoing interface of the forwarding next hop.

13. The network device of claim 9, wherein the first virtual node is configured to, prior to forwarding the network traffic, insert in a packet header of a packet of the network traffic an identifier of a source packet processor of the first virtual node,
 wherein the second virtual node is configured to, in response to receiving the packet by a receiving packet processor of the second subset of packet processors used by the second virtual node, determine the abstract fabric interface on which the packet is received at the second virtual node by looking up the identifier of the source packet processor in a mapping table that maps the identifier to the abstract fabric interface, and
 wherein the second virtual node is configured to process the received packet based on the determined abstract fabric interface.

14. The network device of claim 9, wherein the network device comprises a single-chassis network device.

15. The network device of claim 9, wherein the first virtual node is configured to advertise, to other network devices, the abstract fabric interface as an Ethernet interface between itself and the second virtual node of the network device.

16. The network device of claim 9,
 wherein to forward the network traffic to the second virtual node via the abstract fabric interface, the first virtual node is configured to load balance the network traffic across the plurality of fabric links coupling a packet processor used by the first virtual node to one of the subset of packet processors used by the second virtual node.

17. A computer-readable storage medium comprising instructions for causing one or more programmable processors of a network device to:
 receive an indication of configuration information creating an abstract fabric interface to connect a first virtual node of the network device to a second virtual node of the network device, wherein the network device comprises a plurality of packet processors including a first subset of packet processors used by the first virtual node and a second subset of packet processors used by the second virtual node, the second subset being distinct from the first subset;
 in response to receiving the indication, associate the abstract fabric interface with a list of identifiers of each of the second subset of packet processors of the network device used by the second virtual node;
 create a route at the first virtual node, the route having the abstract fabric interface as a forwarding next hop;
 program a forwarding plane of the first virtual node to attach the list of identifiers to the forwarding next hop;
 receive network traffic at the first virtual node; and
 based on the forwarding next hop, forward the network traffic to the second virtual node via the abstract fabric interface, wherein the instructions for causing the one or more programmable processors of the network device to forward the network traffic to the second virtual node via the abstract fabric interface comprise instructions for causing the one or more programmable processors of the network device to forward the network traffic via one of a plurality of fabric links coupling one of the first subset of packet processors to one of the second subset of packet processors.

* * * * *

UNITED STATES PATENT AND TRADEMARK OFFICE
CERTIFICATE OF CORRECTION

PATENT NO. : 10,511,546 B2
APPLICATION NO. : 15/844338
DATED : December 17, 2019
INVENTOR(S) : Singarayan et al.

Page 1 of 1

It is certified that error appears in the above-identified patent and that said Letters Patent is hereby corrected as shown below:

On the Title Page

Abstract (item (57)): Line 4, Replace "(e.g., PTFE-IDs)" with --(e.g., PFE-IDs)--

Signed and Sealed this
First Day of September, 2020

Andrei Iancu
*Director of the United States Patent and Trademark Office*